United States Patent
Sun et al.

(10) Patent No.: US 10,696,803 B2
(45) Date of Patent: Jun. 30, 2020

(54) GLASS-REINFORCED PDMS COPOLYCARBONATE RESINS

(71) Applicant: SABIC Global Technologies B.V., Bergen op Zoom (NL)

(72) Inventors: Xiaoyu Sun, Evansville, IN (US); Edward Kung, West Chester, PA (US); James Franklin Hoover, Evansville, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/746,589

(22) PCT Filed: Jul. 29, 2016

(86) PCT No.: PCT/US2016/044749
§ 371 (c)(1),
(2) Date: Jan. 22, 2018

(87) PCT Pub. No.: WO2017/019969
PCT Pub. Date: Feb. 2, 2017

(65) Prior Publication Data
US 2019/0002652 A1    Jan. 3, 2019

Related U.S. Application Data

(60) Provisional application No. 62/198,409, filed on Jul. 29, 2015.

(51) Int. Cl.
*C08K 7/14* (2006.01)
*C08J 5/00* (2006.01)
(Continued)

(52) U.S. Cl.
CPC .............. *C08J 5/005* (2013.01); *C08K 7/14* (2013.01); *C08L 69/00* (2013.01); *C08L 83/10* (2013.01);
(Continued)

(58) Field of Classification Search
None
See application file for complete search history.

(56) References Cited

U.S. PATENT DOCUMENTS

| | | | |
|---|---|---|---|
| 4,161,469 A | 7/1979 | LeGrand et al. | |
| 2006/0030647 A1* | 2/2006 | Ebeling | C08K 5/523 524/115 |

(Continued)

FOREIGN PATENT DOCUMENTS

| | | |
|---|---|---|
| CN | 102471569 A | 5/2012 |
| CN | 104271668 A | 1/2015 |

(Continued)

OTHER PUBLICATIONS

Nitto Boseki Co., Ltd., product webpage for chopped strang glass fiber. Retrieved from https://www.nittobo.co.jp/business/glassfiber/frtp/hisff.htm on Dec. 14, 2018. (Year: 2018).*

(Continued)

*Primary Examiner* — Richard A Huhn
(74) *Attorney, Agent, or Firm* — Baker Hostetler

(57) ABSTRACT

A thermoplastic composition including a resin phase and 10% to 55%, especially 25% to 45% of glass fibers by weight of the composition is disclosed. The resin phase includes a polysiloxane block copolymer including polydimethylsiloxane blocks and polycarbonate blocks derived from bisphenol A. The resin phase further includes a polycarbonate and has between 2.0 wt % and 10 wt % by weight of siloxane. The thermoplastic composition has (i) a notched Izod impact strength of at least 150 Joules per meter (Continued)

measured at 23° C. according to ASTM D256, (ii) a tensile strength greater than 95 MPa as determined by ASTM D638, (iii) a tensile modulus greater than 10,900 MPa as determined by ASTM D638 and (iv) an unnotched Izod impact strength greater than 775 Joules per meter measured at 23° C. according to ASTM D256.

8 Claims, 10 Drawing Sheets

(51) Int. Cl.
    *C08L 69/00*     (2006.01)
    *C08L 83/10*     (2006.01)
    *C08K 3/40*     (2006.01)

(52) U.S. Cl.
    CPC ........ *C08J 2369/00* (2013.01); *C08J 2383/10* (2013.01); *C08J 2469/00* (2013.01); *C08J 2483/10* (2013.01); *C08K 3/40* (2013.01); *C08L 2201/00* (2013.01); *C08L 2666/58* (2013.01); *C08L 2666/72* (2013.01)

(56) References Cited

U.S. PATENT DOCUMENTS

| | | | |
|---|---|---|---|
| 2014/0093712 | A1 | 4/2014 | Tong et al. |
| 2014/0371360 | A1* | 12/2014 | Zheng .................... C08L 69/00 524/116 |

FOREIGN PATENT DOCUMENTS

| | | | |
|---|---|---|---|
| CN | 104321380 A | 1/2015 | |
| CN | 104684985 A | 6/2015 | |
| KR | 1996-0001227 B1 | 1/1996 | |
| KR | 2007-0100747 A | 10/2007 | |
| WO | WO-2013170452 A1 * | 11/2013 | ............ C08L 69/005 |
| WO | WO 2016/116409 A1 | 7/2016 | |

OTHER PUBLICATIONS

International Patent Application No. PCT/US2016/044749; Int'l Written Opinion and the Search Report; dated Oct. 21, 2016; 10 pages.

International Patent Application No. PCT/US2016/044749; Int'l Preliminary Report on Patentability; dated Feb. 8, 2018; 8 pages.

* cited by examiner

GLASS-REINFORCED PDMS COPOLYCARBONATE RESINS

CROSS REFERENCE TO RELATED APPLICATIONS

This application is the National Stage of International Application No. PCT/US2016/044749, filed Jul. 29, 2016, which claims the benefit of U.S. Provisional Application No. 62/198,409, filed Jul. 29, 2015, the disclosures of which are incorporated herein by this reference in their entireties.

TECHNICAL FIELD

The disclosure generally relates to glass fiber-reinforced polycarbonate blend compositions, which include polyorganosiloxane-polycarbonate block copolymers and have improved impact strength, tensile strength and aesthetic properties.

BACKGROUND

Aromatic polycarbonate polymers have found wide use as engineering thermoplastics, having inherent toughness and clarity. In particular, polycarbonate blends using polyorganosiloxane-polycarbonate block copolymers are widely used. These copolymers possess enhanced properties such as low temperature impact strength, low temperature ductility, improved processability, and fire retardance. The polyorganosiloxane-polycarbonate block copolymers can be advantageously blended with various proportions of aromatic polycarbonate polymers to prepare thermoplastic molding compositions capable of meeting the wide range of requirements for high and low temperature properties. By varying the selection of the polycarbonate polymer and the proportions of blend ingredients, a wide range of properties may be obtained, starting with a single polyorganosiloxane-polycarbonate block copolymer. Furthermore, the mechanical properties of these blends can be greatly improved by reinforcement with glass fibers making them useful for applications that have stringent performance requirements.

Today, the consumer electronics industry is increasingly calling for ultrastiff tough (UST) materials that have specific mechanical and structural properties to replace metal. These materials must be capable of being injection molded into thin wall parts (i.e., 10 inch tablet cover that is 1.0 mm thick) that are extremely dimensionally stable with little to no warpage and have a high aspect ratio. Good weldline strength and a flat weldline without bumps are also needed to ensure the mechanical integrity of thin-walled parts with a multi-gate design. The materials must also fulfill flame retardant requirements, typically V0-V1 ratings at <=1.0 mm. Glass-reinforced polycarbonate blends generally provide superior mechanical properties in comparison with traditionally used thermoplastic molding compositions such as nylon-based blends, and therefore, may be the best candidate to meet the criteria set forth for UST materials in consumer electronic applications.

There is an unmet need, however, for developing Mass-reinforced polycarbonate blends using polyorganosiloxane-polycarbonate block copolymers, which have the optimal balance of toughness and strength while also retaining other properties, such as low temperature ductility, good processability and fire retardance. Until now, the selection and the proportions of the polycarbonate polymer, the polyorganosiloxane-polycarbonate block copolymer, and the glass fiber needed to achieve the best mechanical performance of these polysiloxane-polycarbonate block copolymers blends has been unknown.

Accordingly, the present disclosure provides thermoplastic compositions that are glass-fiber reinforced blends of polyorganosiloxane-polycarbonate block copolymer and polycarbonate polymer that possess superior mechanical properties.

SUMMARY

In accordance with one aspect of the disclosure, a thermoplastic composition including a resin phase and 10% to 55%, especially 25% to 45% of glass fibers by weight of the thermoplastic composition is disclosed. The resin phase includes a polysiloxane block copolymer including polyorganosiloxane blocks and polycarbonate blocks. The resin phase further includes a polycarbonate and has between 2.0% and 10% by weight of siloxane blocks.

In accordance with another aspect of the disclosure, a thermoplastic composition including a resin phase and 10% to 55%, especially 25% to 45% of glass fibers by weight of the thermoplastic composition is disclosed. The resin phase includes a polysiloxane block copolymer including polydimethylsiloxane blocks and polycarbonate blocks derived from bisphenol A. The resin phase further includes a polycarbonate and has between 2.0% and 10% by weight of siloxane. The thermoplastic composition has (i) a notched Izod impact strength of at least 150 Joules per meter measured at 23° C. according to ASTM D256; (ii) a tensile strength greater than 95 MPa as determined by ASTM D638, (iii) a tensile modulus greater than 10,900 MPa as determined by ASTM D638 and (iv) an unnotched Izod impact strength greater than 775 Joules per meter measured at 23° C. according to ASTM D256.

In accordance with another aspect of the disclosure, a thermoplastic composition including 10% to 55%, especially 25% to 45% of glass fibers by weight of the thermoplastic composition and a resin phase is disclosed. The resin phase includes a polysiloxane block copolymer and a polycarbonate polymer, wherein the polysiloxane block copolymer has repeating structural units of formula (I)

wherein at least 60 percent of the total number of $R^1$ groups are aromatic organic radicals and the balance thereof are aliphatic, alicyclic, or aromatic radicals, and repeating structural units of formula (IV)

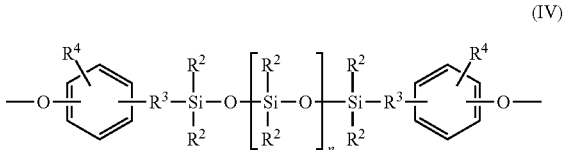

wherein $R^2$ is independently at each occurrence a hydrocarbyl radical such as an alkyl, aryl, aralkyl, and cycloalkyl radical, having 1 to 25 carbon atoms, $R^3$ is a divalent aliphatic radical having 1 to 8 carbon atoms or an aromatic radical having 6 to 8 carbon atoms, $R^4$ is independently at each occurrence a hydrogen, halogen; alkoxy having 1 to 8 carbon atoms, alkyl having 1 to 8 carbon atoms, or aryl having 6 to 13 carbon atoms; and wherein n is an integer that is less than or equal to 1.000. The polycarbonate polymer is different than the block copolymer and has repeating structural units of formula (XVIII)

(XVIII)

wherein at least 60 percent of the total number of R⁹ groups are aromatic organic radicals and the balance thereof are aliphatic, alicyclic, or aromatic radicals.

DETAILED DESCRIPTION

Figure 1:
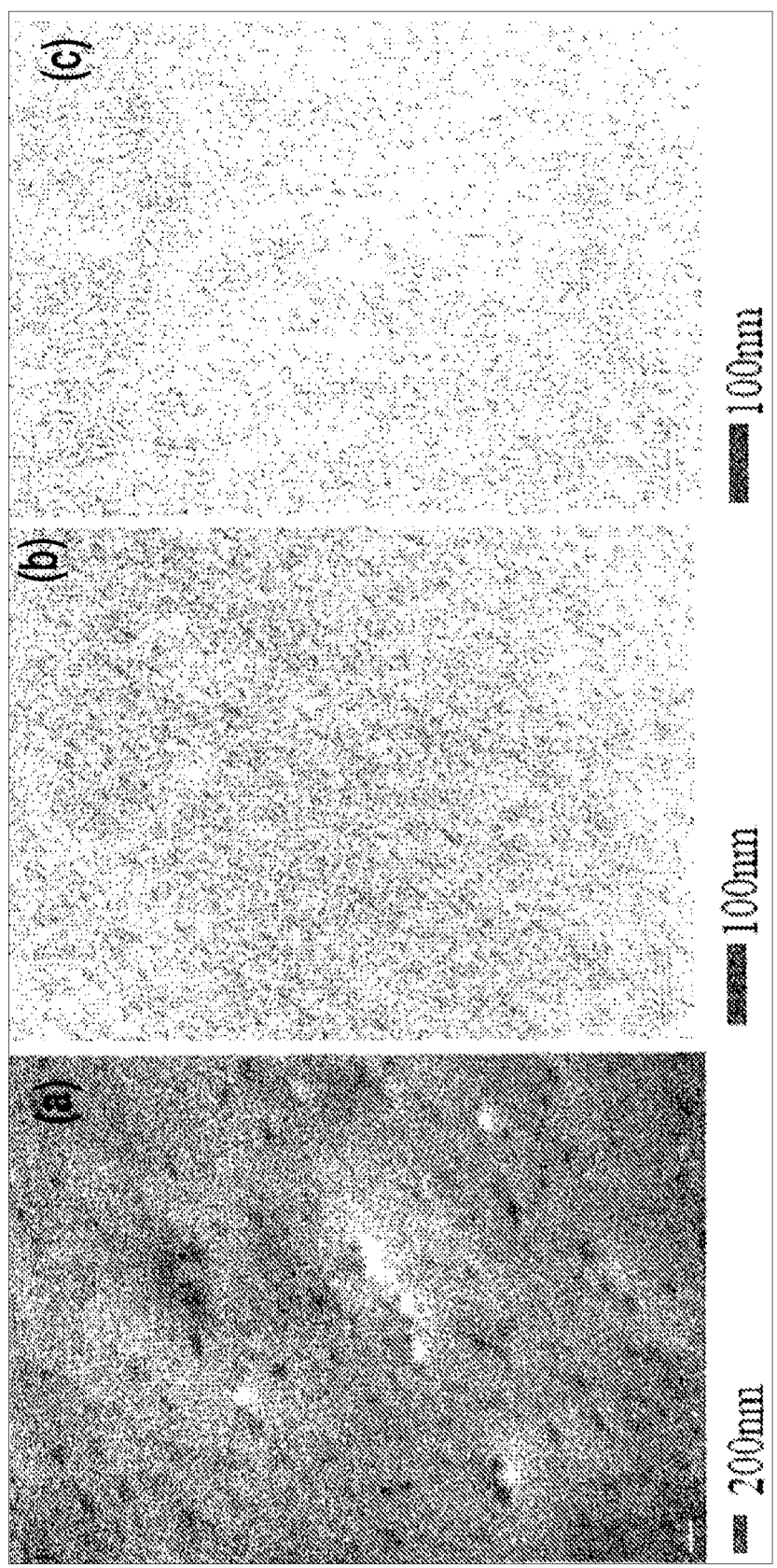
FIG. 1 is a TEM photomicrograph of an (a) opaque, (b) semi-transparent and (c) transparent polysiloxane/polycarbonate block copolymer resin showing the domain size.

Disclosed herein are glass fiber reinforced thermoplastic compositions. The thermoplastic composition has a resin phase that includes a polysiloxane block copolymer and a polycarbonate polymer. The poly siloxane block copolymer is a polyorganosiloxane-polycarbonate block copolymer composed of polyorganosiloxane blocks and polycarbonate blocks. Disclosed herein too are articles molded from the thermoplastic compositions. As set forth in further detail below, the thermoplastic compositions and the articles disclosed herein have superior mechanical properties, including tensile strength and impact strength and also have improved aesthetic properties.

The polyorganosiloxane/polycarbonate block copolymer comprises polycarbonate blocks and polyorganosiloxane blocks. The polycarbonate blocks comprise repeating structural units of the formula (I),

(I)

in which at least 60 percent of the total number of R¹ groups are aromatic organic radicals and the balance thereof are aliphatic, alicyclic, or aromatic radicals. R¹ may be an aromatic organic radical of the formula (II),

(II)

wherein each of A¹ and A² is a monocyclic divalent aryl radical and Y¹ is a bridging radical having one or two atoms which separate A¹ from A². In one embodiment, one atom separates A¹ from A². Illustrative non-limiting examples of radicals of this type include —O—, —S—, —S(O)—, —S(O)₂—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical Y¹ may be an unsaturated hydrocarbon group or a saturated hydrocarbon group such as methylene, cyclohexylidene, or isopropylidene.

The polyorganosiloxane blocks comprise repeating structural units of the formula (III),

(III)

wherein R² is independently at each occurrence a hydrocarbyl radical such as an alkyl, aryl, aralkyl and cycloalkyl radical having 1 to 25 carbon atoms, and "n" is an integer greater than or equal to 1, or, more specifically, greater than or equal to about 10, or, even more specifically, greater than or equal to about 25. In one embodiment n is greater than or equal to about 40. The integer "n" may also be less than or equal to about 1000, or, more specifically, less than or equal to about 100, or, even more specifically, less than or equal to about 75 or, even more specifically less than or equal to about 60. As is readily understood by one of ordinary skill in the art, "n" represents an average value.

In one embodiment, the polyorganosiloxane blocks comprise repeating structural units of the formula (IV),

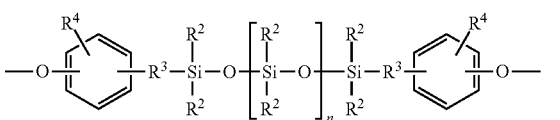

(IV)

wherein R² and "n" are as defined above. R³ is independently at each occurrence a divalent aliphatic radical having 1 to 8 carbon atoms or aromatic radical having 6 to 8 carbon atoms. In one embodiment each occurrence of R³ is in the ortho or para position relative to the oxygen. R⁴ is independently at each occurrence a hydrogen, halogen, alkoxy having 1 to 8 carbon atoms, alkyl having 1 to 8 carbon atoms or aryl having 6 to 13 carbon atoms and "n" is an integer less than or equal to about 1000, specifically less than or equal to about 100, or, more specifically, less than or equal to about 75 or, even more specifically, less than or equal to about 60. As is readily understood by one of ordinary skill in the art, n represents an average value.

In one embodiment in the above formula (IV), $R^2$ is independently at each occurrence an alkyl radical having 1 to 8 carbons; $R^1$ is independently at each occurrence a dimethylene, trimethylene or tetramethylene, $R^4$ is independently at each occurrence a halogen radical, such as bromo and chloro; alkyl radical such as methyl, ethyl, and propyl; alkoxy radical such as methoxy, ethoxy, and propoxy; aryl radical such as phenyl, chlorophenyl, and tolyl. In one embodiment $R^3$ is methyl, a mixture of methyl and trifluoropropyl, or a mixture of methyl and phenyl.

The polyorganosiloxane/polycarbonate block copolymers may have an average molecular weight measured, for example, by ultra-centrifugation or light scattering; gel permeation chromatography of greater than or equal to about 10,000 to about 200,000, or, more specifically, about 20,000 to about 100,000. It is generally desirable to have polydimethylsiloxane units contribute about 0.5 to about 80 weight percent of the total weight of the polyorganosiloxane/polycarbonate block copolymer or an equal molar amount of other polydiorganosiloxane. Even more specific is a range of about 1 to about 10 weight percent of siloxane units in the polyorganosiloxane/polycarbonate block copolymer.

The polyorganosiloxane/polycarbonate block copolymer comprises polyorganosiloxane domains having an average domain size of less than or equal to 45 nanometers. Within this range the polyorganosiloxane domains may be greater than or equal to about 5 nanometers. Also within this range the polyorganosiloxane domains may be less than or equal to about 40 nanometers, or, more specifically, less than or equal to about 10 nanometers.

Domain size may be determined by Transmission Electron Microscopy (TEM) as follows. A sample of the polyorganosiloxane/polycarbonate block copolymer is injection molded into a sample 60 millimeters square and having a thickness of 3.2 millimeters. A block (5 millimeters by 10 millimeters) is cut from the middle of the sample. The block is then sectioned from top to bottom by an ultra microtome using a diamond knife at room temperature. The sections are 100 nanometers thick. At least 5 sections are scanned by TEM at 100 to 120 kilovolts (kV) and the images recorded at 66,000× magnification. The polysiloxane domains were counted and measured, the domain size reflecting the longest single linear dimension of each domain. The domain sizes over the 5 sections were then averaged to yield the average domain size.

Also specifically envisioned are polyorganosiloxane/polycarbonate block copolymers prepared by direct synthesis comprising a polycarbonate matrix and the desired embedded polysiloxane domains. In a blend of two polyorganosiloxane/polycarbonate block copolymers the individual copolymers are generally difficult to separate or to distinguish, With Transmission Electron Microscopy (TEM) it is however possible to distinguish in the blend a polycarbonate matrix and embedded polysiloxane domains.

Polyorganosiloxane/polycarbonate block copolymers may be made by a variety of methods such as interfacial polymerization, melt polymerization, and solid-state polymerization. For example, the polyorganosiloxane/polycarbonate block copolymers may be made by introducing phosgene under interfacial reaction conditions into a mixture of a dihydric aromatic compound, such as bisphenol A (hereinafter at times referred to as BPA), and a hydroxyaryl-terminated polyorganosiloxane. The polymerization of the reactants may be facilitated by use of a tertiary amine catalyst or a phase transfer catalyst.

The hydroxyaryl-terminated polyorganosiloxane may be made by effecting a platinum catalyzed addition between a siloxane hydride of the formula (V),

and an aliphatically unsaturated monohydric phenol wherein $R^2$ and n are as previously defined.

Non-limiting examples of the aliphatically unsaturated monohydric phenols, which may be used to make the hydroxyaryl-terminated polyorganosiloxanes include, for example, 4-allyl-2-methoxy phenol (herein after referred to as eugenol); 2-alkylphenol, 4-allyl-2-methylphenol; 4-allyl-2-phenylphenol; 4-allyl-2-bromophenol; 4-allyl-2-t-butoxyphenol; 4-phenyl-2-phenylphenol; 2-methyl-4-propylphenol; 2-allyl-4,6-dimethylphenol; 2-allyl-4-bromo-6-methylphenol; 2-allyl-6-methoxy-4-methylphenol and 2-allyl-4,6-dimethylphenol. Mixtures of aliphatically unsaturated monohydric phenols may also be used.

Among the suitable phase transfer catalysts which may be utilized are catalysts of the formula $(R^5)_4Q^+X$, where $R^5$ is independently at each occurrence an alkyl group having 1 to 10 carbons, Q is a nitrogen or phosphorus atom, and X is a halogen atom, or an —$OR^6$ group, where $R^6$ is selected from a hydrogen, an alkyl group having 1 to 8 carbon atoms and an aryl group having 6 to 18 carbon atoms. Some of the phase transfer catalysts which may be used include [$CH_3(CH_2)_3]_4NX$, [$CH_3(CH_2)_3]_4PX$, [$CH_3(CH_2)_5]_4NX$, [$CH_3(CH_2)_6]_4NX$, [$CH_3(CH_2)_4]_4NX$, $CH_3[CH_3(CH_2)_3]_3NX$, $CH_3[CH_3(CH_2)_2]_3NX$ wherein X is selected from Cl$^-$, Br$^-$ or —$OR^6$. Mixtures of phase transfer catalysts may also be used. An effective amount of a phase transfer catalyst is greater than or equal to 0.1 weight percent (wt %) and in one embodiment greater than or equal to 0.5 wt % based on the weight of bisphenol in the phosgenation mixture. The amount of phase transfer catalyst may be less than or equal to about 10 wt % and more specifically less than or equal to 2 wt % based on the weight of bisphenol in the phosgenation mixture.

Non-limiting examples of dihydric aromatic compounds which may be subjected to phosgenation include, resorcinol; 4-bromoresorcinol; hydroquinone; 4,4'-dihydroxybiphenyl; 1,6-dihydroxynaphthalene; 2,6-dihydroxynaphthalene; bis(4-hydroxyphenyl)methane; bis(4-hydroxyphenyl)diphenylmethane; bis(4-hydroxyphenyl)-1-naphthylmethane; 1,1-bis(4-hydroxyphenyl)methane; 1,1-bis(4-hydroxyphenyl)ethane; 1,2-bis(4-hydroxyphenyl)ethane; 1,1-bis(4-hydroxyphenyl)-1-phenylethane; 2,2-bis(4-hydroxyphenyl)propane; 2-(4-hydroxyphenyl)-2-)3-hydroxyphenyl)propane; 2,2-bis(4-hydroxyphenyl)butane; 2,2-bis(4-hydroxyphenyl) octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl) propane; 1,1-bis(4 hydroxy-tert-butylphenyl)propane; 2,2-bis(4-hydroxy-3-bromophenyl)propane; 1,1-bis(hydroxyphenyl)cyclopentane; 1,1-bis(4-hydroxyphenyl)cyclohexane; 1,1-bis(4-hydroxyphenyl)isobutene; 1,1-bis(4-hydroxyphenyl)cyclododecane; trans-2,3-bis(4-hydroxyphenyl)-2-butene; 2,2-bis(4-hydroxyphenyl)adamantine;

(alpha, alpha'-bis(4-hydroxyphenyl)toluene, bis(4-hydroxyphenyl)acetonitrile, 2,2-bis(3-methyl-4-hydroxyphenyl)propane; 2,2-bis(3-ethyl-4-hydroxyphenyl)propane; 2,2-bis(3-n-propyl-4-hydroxyphenyl)propane, 2,2-bis(3-isopropyl-4-hydroxyphenyl)propane; 2,2-bis(3-sec-butyl-4-hydroxyphenyl)propane; 2,2-bis(3-t-butyl-4-hydroxyphenyl)propane; 2,2-bis(3-cyclohexyl-4-hydroxyphenyl)propane; 2,2-bis(3-allyl-4-hydroxyphenyl)propane; 2,2-bis(3-methoxy-4-hydroxyphenyl)propane; 2,2-bis(4-hydroxyphenyl)hexafluoropropane; 1,1-dichloro-2,2-bis(4-hydroxyphenyl)ethylene; 1,1-dibromo-2,2-bis(4-hydroxyphenyl)ethylene; 1,1-dichloro-2,2-bis(5-phenoxy-4-hydroxyphenyl)ethylene; 4,41f-dihydroxybenzophenone; 3,3-bis(4-hydroxyphenyl)-2-butanone; 1,6-bis(4-hydroxyphenyl)-1,6-hexanedione; ethylene glycol bis(4-hydroxyphenyl)ether; bis(4-hydroxyphenyl)ether; bis(1-hydroxyphenyl)sulfide; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethylspiro(bis)indane ("spirobiindane bisphenol"); 3,3-bis(4-hydroxyphenyl)phthalide; 2,6-dihydroxydibenzo-p-dioxin, 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene and 2,7-dihydroxycarbazole. Mixtures of dihydric aromatic compounds may also be used.

The polyorganosiloxane/polycarbonate block copolymer may be produced by blending aromatic dihydroxy compound with an organic solvent and an effective amount of phase transfer catalyst or an aliphatic tertiary amine, such as triethylamine, under interfacial conditions. Sufficient alkali metal hydroxide may be utilized to raise the pH of the bisphenol reaction mixture prior to phosgenation, to 10.5 pH. This may result in the dissolution of some of the bisphenol into the aqueous phase. Suitable organic solvents that may be used are, for example, chlorinated aliphatic hydrocarbons, such as methylene chloride, chloroform, carbon tetrachloride, dichloroethane, trichloroethane, tetrachloroethane, dichloropropane, and 1,2-dichloroethylene; substituted aromatic hydrocarbons such as chlorobenzene, o-di chlorobenzene, and the various chlorotoluenes. Mixtures of organic solvents may also be used. In one embodiment the solvent comprises methylene chloride.

Aqueous alkali metal hydroxide or alkaline earth metal hydroxide addition may be used to maintain the pH of the phosgenation mixture near the pH set point, which may be in the range of 10 to 12. Some of the alkali metal or alkaline earth metal hydroxides, which may be employed, are for example, sodium hydroxide, potassium hydroxide, and calcium hydroxide. In one embodiment the alkali metal hydroxide used comprises sodium hydroxide.

During the course of phosgene introduction at a pH of 10 to 12, and depending upon the rate of phosgene addition, the pH may be lowered to allow for the introduction of the hydroxyaryl-terminated polyorganosiloxane. End-capping agents such as phenol, p-butylphenol, p-cumylphenol, octylphenol, nonylphenol, and other mono hydroxy aromatic compounds may be used to regulate the molecular weight or to terminate the reaction.

Alternatively the polyorganosiloxane/polycarbonate block copolymer may be produced by an aromatic dihydroxy compound in the presence of a phase transfer catalyst at a pH of 5 to 8 to form bischloroformate oligomers. Then to this is added a hydroxyaryl-terminated polyorganosiloxane, which is allowed to react at a pH of 9 to 12 for a period of time sufficient to effect the reaction between the bischloroformate oligomers and the hydroxyaryl-terminated polydiorganosiloxane, typically a time period of 10 to 45 minutes. Generally there is a large molar excess of chloroformate groups relative to hydroxyaryl groups. The remaining aromatic dihydroxy compound is then added, and the disappearance of chloroformates is monitored, usually by phosgene paper. When substantially all chloroformates have reacted, an end-capping agent and optionally a trialkylamine are added and the reaction phosgenated to completion at a pH of 9 to 12.

The polyorganosiloxane/polycarbonate block copolymer may be made in a wide variety of batch, semi-batch or continuous reactors. Such reactors are, for example, stirred tank, agitated column, tube, and recirculating loop reactors. Recovery of the polyorganosiloxane/polycarbonate block copolymer may be achieved by any means known in the art such as through the use of an anti-solvent, steam precipitation or a combination of anti-solvent and steam precipitation.

The thermoplastic composition may comprise blends of two or more polyorganosiloxane/polycarbonate block copolymers. These block copolymers may be opaque, transparent or semi-transparent.

The thermoplastic composition comprises at least one polycarbonate polymer in addition to the polyorganosiloxane/polycarbonate block copolymer. The polycarbonate polymer may be a homopolymer, a copolymer, or mixtures thereof. In one aspect of the present disclosure, the polycarbonate polymer is not a polyorganosiloxane-polycarbonate block copolymer of the type described by formula (IV). The polycarbonate polymer generally has a weight average molecular weight, from about 20,000 to about 80.000. In several embodiments, the polycarbonate polymer has a weight average molecular weight from about 30,000 to about 45,000, from about 40,000 to 42,000, from about 55.000 to about 65,000, and from about 58,000 to about 60,000.

The polycarbonate polymer comprises structural units derived from at least one bisphenol of the formula (I) as previously described, Examples of bisphenols that can be used as a building block for producing the polycarbonate polymer include, but are not intended to be limited to those selected from the group consisting of 4,4'-(3,3,5-trimethylcyclohexylidene)diphenol, 4,4'-bis(3,5-dimethyl)diphenol, 1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene; hydroquinone; resorcinol, $C_{1-3}$-alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, 1-methyl-1,3-bis(4-hydroxyphenyl)-3-isopropylcyclohexane, 1-methyl-2-(4-hydroxyphenyl)-3-[1-(4-hydroxyphenyl)isopropyl]cyclohexane, and combinations thereof; and combinations comprising at least one of the foregoing aromatic dihydroxy compounds.

The thermoplastic compositions of the present disclosure further include glass fiber. In some aspects of the present disclosure, the glass fiber used in the composition may be selected from E-glass, S-glass, AR-glass, T-glass, D-glass and R-glass. The diameter of the glass fibers may range from 5 to 35 μm. In an alternative aspect, the diameter of the glass fibers may range from 10 to 20 μm. The thermoplastic composition may be reinforced with glass fibers having a length of 0.4 mm or longer. In one aspect of the present disclosure, the glass fibers have a length of 1 mm or longer. In other aspects, the glass fibers have a length of 1 mm or longer.

The glass fiber used in select aspects of the invention may, in alternative embodiments, be surface-treated with a surface treatment agent containing a coupling agent. Suitable coupling agents include, but are not limited to, silane-based coupling agents, titanate-based coupling agents or a mixture thereof. Applicable silane-based coupling agents include aminosilane, epoxysilane, amidesilane, azidesilane and acrylsilane.

In one aspect of the present disclosure, the amount of glass fiber used in the thermoplastic composition is from 5 to 60% by weight of the composition. In another aspect, the amount of glass fiber used in the thermoplastic composition is 10 to 55% by weight of the composition. In still another aspect, the amount of glass fiber is from 20 to 45% by weight of the thermoplastic composition.

In certain aspects of the present, disclosure, reinforcing fillers may comprise an additional optional component of the thermoplastic resin composition. Reinforcing fillers, per se, are also well known in the art. Accordingly, virtually any reinforcing filler known in the art is suitable according to the present invention. For example, the present disclosure may include at least one inorganic filler selected from glass, asbestos, talc, quartz, calcium carbonate, calcium sulfate, barium sulfate, carbon fiber, silica, zinc oxide, zirconium oxide, zirconium silicate, strontium sulfate, alumina, anhydrous aluminum silicate, barium ferrite, mica, feldspar, clay, magnesium oxide, magnesium silicate, nepheline syenite, phenolic resins, wollastonite, and titanium dioxide or mixtures thereof. The term glass fillers in intended to include any type of glass used as a filler such as glass fibers, mill glass, glass spheres and microspheres, etc.

In a further aspect, the thermoplastic resin composition may include carbon black. In a still further aspect, the thermoplastic resin composition may include additives such as colorants to further enhance the aesthetics of the molded article.

The composition may be formed by melt kneading or melt blending the polyorganosiloxane/polycarbonate block copolymer, the polycarbonate polymer, glass fibers and any optional components. Melt-kneading devices are known in the art and include single-screw, twin-screw, and multi-screw type extruders, ribbon blenders, Henschel mixers, Banbury mixers, drum tumblers, single screw extruders, co-kneaders, and similar mixing devices that can apply shear to the components.

The thermoplastic compositions are ideally suited for forming articles by shaping, extruding, or molding. In particular, articles may be molded from the compositions by known processes, such as injection molding, injection compression molding, gas assist injection molding, rotary molding, blow molding, compression molding and related molding processes.

The thermoplastic compositions disclosed herein are useful for applications where high strength, stiffness and impact resistance are desired for a moldable material. The thermoplastic compositions are thus useful in a variety of applications, for example, in the manufacture of electrical or electronic parts, including computer and business machine housings, handheld electronic device housings such as housings for cell phones, electrical connectors, and components of light fixtures, ornaments, home appliances, roofs, greenhouses, sun rooms, swimming pool enclosures and the like. The compositions can be advantageously used for molded components, for example, housings subject to an outside environment or heat exposure during use, for example housings or other components in automotive vehicles, including trucks, construction machinery, and the like.

The following examples will serve to further illustrate the disclosure, but it should be understood that the disclosure is not restricted to these specific examples. Parts and percentages are by weight unless otherwise stated.

In the following examples, "PC-BPA" refers to a polycarbonate polymer derived from bisphenol A, "PDMS" refers to polydimethylsiloxane polymer.

"Si/PC-P" refers to an opaque polyorganosiloxane/polycarbonate block copolymer composed of PDMS and PC-BPA units having a block length of 45 (D45) and containing 20% siloxane by weight. Si/PC-P is prepared using a batch polymerization process that results in a more random form and a larger domain size creating an opaque copolymer. A description of the preparation of Si/PC-T used in the examples is set forth below.

"Si/PC-T" refers to a transparent polyorganosiloxane/polycarbonate block copolymer composed of PDMS and PC-BPA units having a block length of 45 (D45) and containing approximately 6% siloxane by weight. Si/PC-P is prepared by a tube polymerization process that results in a more interval copolymer and smaller domain sizes to create a transparent copolymer. A description of the preparation of Si/PC-T used in the examples is set forth below.

"Si/PC-PT" refers to a semi-transparent polyorganosiloxane/polycarbonate block copolymer containing 20% siloxane by weight prepared by a tube polymerization process. A description of the preparation of Si/PC-T used in the examples is set forth below.

The domain sizes of the (a) opaque Si/PC-P, (b) semi-transparent Si/PC-PT, and (c) transparent Si/PC-T (c) polyorganosiloxane/polycarbonate block copolymers in TEM micrographs are shown in FIG. 1. From the TEM micrograph, it may be seen that the domains are fairly uniform in size in the nanometer range.

Preparation of Si/PC-P

The following describes the preparation of Si/PC-P used in the examples. Dichloromethane (15 L), DI water (10 L), bisphenol-A (3700 g, 16.2 moles), D45 eugenol siloxane (1150 g, 0.30 mole), triethylamine (30 g, 0.30 mole, 1.7 mole %) and sodium gluconate (10 g, iron scavenger) was added to a formulation tank. The mixture was stirred and then transferred to a batch reactor. The formulation tank was rinsed with dichloromethane (5 L) which was transferred to the batch reactor. The reactor agitator was started and the circulation flow was set at 80 L/min. Phosgene vapor flow to the reactor was initiated by the DCS (segment 1: 215 g, 80 g/min rate). The pH of the reaction was maintained at a target of 10.0 by DCS controlled addition of 33% aqueous NaOH. After addition of 215 g of phosgene a solution of PCP (116 g, 0.55 mole) in dichloromethane was added to the reactor by DCS control while phosgene flow to the reactor continued. Phosgene addition continued until the total set point was reached (2150 g, 21.7 moles). After completion of the phosgene addition, a sample of the reactor was obtained and verified to be free of un-reacted BPA and free of chloroformate. Mw of a reaction sample was determined by GPC (Mw=30278, PDI=2.7). An additional charge of phosgene was added (200 g, 2.0 mole) to the reactor. The reactor was purged with nitrogen and the batch was then transferred to the centrifuge feed tank.

A dichloromethane dilution (8 L) was added to the batch in the feed tank and then the mixture was purified using a train of liquid—liquid centrifuges. Centrifuge one removed the brine phase. Centrifuge two removed the catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped dryer using heated nitrogen (210° F.). Powder yield 3.1 kg. Mw=28925, PDI=2.9.

Si/PC-T Preparation

The following describes the preparation of Si/PC-T used in the examples. The batch was made using solution program addition of the end cap and pre-phosgenation of the siloxane monomer using a tubular reactor to obtain a polycarbonate resin.

A solution of p-cumylphenol (157 grams, 0.74 moles, 4.0 mole %) was prepared in 500 mL of dichloromethane. The p-cumylphenol (PCP) solution was placed in an addition pot connected to the reactor via a dosing pump.

A solution of eugenol capped D45 siloxane (312 g, 0.0082 mole, 5.8 wt % siloxane) was prepared in 900 mL of dichloromethane. The D45 siloxane solution was placed in an addition tank connected to the tubular reactor via a dosing pump. The tubular reactor (½ inch diameter×15 feet length, spiral upflow) is connected to the batch reactor.

Dichloromethane (13 L), DI water (8 L), bisphenol-A (4000 grams, 17.5 moles), triethylamine (30 grams, 0.30 moles) and sodium gluconate (10 grams, iron scavenger) was added to the formulation tank. The mixture was stirred for 5 minutes and then transferred to the 70 L batch reactor which was equipped with an overhead condenser, circulation loop, pH probe and various material addition nozzles. The formulation tank was rinsed with dichloromethane (5 L) which was transferred to the batch reactor. The reactor agitator was started and the circulation flow was set at 80 L/min. Phosgene vapor flow to the reactor was initiated (80 g/min flow rate) by the DCS and an initial amount (220 grams, 2.2 moles) was added. The pH of the reaction was maintained at a target of 10.0 by DCS-controlled addition of 33% aqueous NaOH.

After addition of the initial amount of phosgene, the PCP solution was added to the reactor at 250 mL/min flow rate while phosgene flow to the reactor continued. At the same time the feed to the tubular reactor was initiated with D45 siloxane flow (500 g/min) combining with phosgene (28 g/min, 0.28 mole/min) and 18% aqueous NaOH (316 g/min, 1.4 moles/min) in the plug flow reactor directly feeding into the batch reactor. After completion of the dosing of the D45 siloxane mixture to the reaction, the flow of phosgene and aqueous NaOH was stopped and tubular reactor was flushed with dichloromethane (2 L). Phosgene addition to the batch reactor continued with pH control throughout the additions and until the total set point was reached (2200 grams, 22.2 moles). After completion of the phosgene addition, a sample of the reactor was obtained and verified to be free of un-reacted BPA and free of chloroformate. Mw of a reaction sample was determined by GPC using a UV detector (Mw=23533, PDI=2.7). An additional charge of phosgene was added (200 grams, 2.0 mole) to the reactor. The reactor was purged with nitrogen then the batch was transferred to the centrifuge feed tank.

A dichloromethane dilution (8 L) was added to the batch in the centrifuge feed tank and then the mixture was purified using a train of liquid—liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3.5 kg. Mw=23297 PDI=2.7.

Si/PC-PT Preparation

The following describes the preparation of Si/PC-PT used in the examples. Dichloromethane (6 L), DI water (9 L), bisphenol-A (3700 g, 16.2 moles), p-cumylphenol (116 g, 0.55 mole), triethylamine (30 g, 0.30 mole) and sodium gluconate (10 g) was added to the formulation tank. The mixture was transferred to the batch reactor. The formulation tank was rinsed with dichloromethane (3 L) which was transferred to the batch reactor. The reactor agitator was started and circulation flow was set at 80 L/min. Phosgene flow to the reactor was initiated (segment 1: 230 g, 80 g/min rate). A pH target of 10.0 was maintained throughout the batch by the DCS controlled addition of 33% aqueous sodium hydroxide. After 230 g phosgene addition to the batch reactor, the tubular reactor was initiated to add D45 siloxane bis-chloroformate to the batch reactor (1150 g, 0.30 mole, 20 wt % solution in dichloromethane chilled to 50 F). The D45 solution flow rate to the tubular reactor was 500 g/min (11.5 min addition cycle) with phosgene addition to the tubular reactor at 28 g/min (5 mol phosgene/mol D45 OH group) and 18% aqueous sodium hydroxide flow to the tubular reactor at 316 g/min (5 mol NaOH/mol phosgene, chilled to 40 F). After completion of siloxane addition to the tubular reactor, the batch reactor was flushed with dichloromethane (2 L) and DI water (2 L). Phosgene flow continued to the batch reactor during the tubular reactor cycle (segment 2: 2070 g, 80 g/min rate). The total phosgene addition time to the batch reactor was 29 minutes. A sample of the reactor was obtained and verified to be free of unreacted BPA and free of chloroformate. Mw of the reaction sample was determined by GPC Mw=33185, PDI=3.1. The reactor was purged with nitrogen then the batch was transferred to the centrifuge feed tank.

A dichloromethane dilution (8 L) was added to the batch in the feed tank and then the mixture was purified using a train of liquid—liquid centrifuges. Centrifuge one removed the brine phase. Centrifuge two removed the catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped dryer using heated nitrogen (210° F.). Powder yield 3.5 kg (Mw=33223, PDI=3.1).

The presence of chloroformate is determined by placing approximately 1 mL of reactor organic phase onto paper tape that is impregnated with 4-(4-nitrobenzyl)pyridine. A yellow to orange color change indicates the presence of chloroformate groups.

The presence of unreacted BPA in reactor samples is determined by the following method. 2 mL of reactor sample organic phase is diluted in 5 mL of dichloromethane. 5 mL of dilute ammonium hydroxide is added to the solution and the mixture is shaken vigorously for 30 seconds. 10 mL of 1% aqueous potassium ferricyanide is added to the mixture and the mixture is shaken vigorously for 30 seconds. 5 mL of 1% aqueous 4-aminoantipyrine is added to the mixture and the mixture is shaken vigorously for 30 seconds. A yellow color indicates an acceptable low amount of residual BPA. An orange to red color indicates an unacceptable high amount of residual BPA.

EXAMPLES

Example 1

BPA Polycarbonate/20% Siloxane Polycarbonate Block Copolymer Blends with E-Glass Fiber A design of experiment analysis was performed to evaluate the effect of changes in % siloxane on the mechanical performance of polycarbonate blend compositions that comprise polyorganosiloxane/polycarbonate block copolymer, polycarbonate polymer and glass fiber. The target of the study was to design polycarbonate blend compositions using different loadings of polyorganosiloxane/polycarbonate block copolymer and glass fiber.

The polysiloxane/polycarbonate block copolymer used was 100% Si/PC-P, an opaque block copolymer of bisphenol A and polydimethysiloxane having 20% siloxane by weight. The glass fiber was Lexan™ bonding glass fiber G912, an E-glass fiber sized for polycarbonate polymer (commercially available from SABIC Innovative Plastics). The polycarbonate polymer, PC-BPA was a high flow grade derived from bisphenol A. A phosphite heat stabilizer was included in each formulation in equal amounts.

The design of experiment results are set forth in Table 1 below as formulations (1-10). The effective % siloxane for the overall composition (resin phase and glass phase) as well as the effective % siloxane for the resin phase were calculated and are shown in Table 1. All quantities in Table 1 are expressed as weight percentages.

TABLE 1

| Description | 1 | 2 | 3 | 4 | 5 | 6 | 7 | 8 | 9 | 10 |
|---|---|---|---|---|---|---|---|---|---|---|
| Si/PC—P | 0 | 0 | 16.24 | 16.24 | 27.48 | 37.48 | 43.71 | 53.71 | 64.95 | 74.95 |
| PC—BPA HF Grade | 74.95 | 54.95 | 53.71 | 43.71 | 27.48 | 37.48 | 16.24 | 16.24 | 0 | 0 |
| E-Glass Fiber | 25 | 45 | 30 | 40 | 45 | 25 | 40 | 30 | 35 | 25 |
| Phosphite Stabilizer | 0.05 | 0.05 | 0.05 | 0.05 | 0.05 | 0.05 | 0.05 | 0.05 | 0.05 | 0.05 |
| TOTAL | 100 | 100 | 100 | 100 | 100 | 100 | 100 | 100 | 100 | 100 |
| Effective % Si: resin + glass fiber phase | 0.0 | 0.0 | 3.2 | 3.2 | 5.5 | 7.5 | 8.7 | 10.7 | 13.0 | 15.0 |
| Effective % Si: resin phase | 0.0 | 0.0 | 4.6 | 5.4 | 10.0 | 10.0 | 14.6 | 15.3 | 20.0 | 20.0 |
| Effective total resin content | 75 | 55 | 70 | 60 | 55 | 75 | 60 | 70 | 65 | 75 |

Example 2

BPA Polycarbonate/20% Siloxane Polycarbonate Copolymer Blends with S-Glass Fiber A second design of experiment analysis was performed to further evaluate the effect of the changes in % siloxane on the mechanical performance of polycarbonate blend compositions that comprise polysiloxane/polycarbonate block copolymer, polycarbonate and glass fiber. As before in Example 1, the target of the study was to design polycarbonate blend compositions using different loadings of polysiloxane/polycarbonate block copolymer and glass fiber.

The polysiloxane/polycarbonate block copolymer used was the same as in Example 1 (100% Si/PC-P) an opaque copolymer of bisphenol A and polydimethylsiloxane having 20% siloxane by weight. The glass fiber was 10 μm, 4.7 mm S-glass fiber (commercially available from Owens Corning Fiberglass). The polycarbonate polymer was a high flow grade derived from bisphenol A. A phosphite heat stabilizer was included in each formulation in equal amounts.

The design of experiment results are set forth in Table 2 below as formulations (1-11). The effective % siloxane for the overall composition was calculated for each formulation and is shown in Table 2. All quantities in Table 2 are expressed as weight percentages.

TABLE 2

| Description | 1 | 2 | 3 | 4 | 5 | 6 | 7 | 8 | 9 | 10 | 11 |
|---|---|---|---|---|---|---|---|---|---|---|---|
| Si/PC—P | 0.0 | 0. | 0.0 | 9.983 | 14.975 | 14.975 | 14.975 | 22.463 | 22.463 | 29.95 | 29.95 |
| PC—BPA HF Grade | 89.95 | 67.45 | 44.95 | 49.967 | 74.975 | 63.725 | 29.975 | 44.988 | 33.738 | 60.0 | 15.00 |
| S-glass fiber | 10.0 | 32.5 | 55.0 | 40.0 | 10.0 | 21.250 | 55.0 | 32.50 | 43.750 | 10.0 | 55.00 |
| Stabilizer | 0.05 | 0.05 | 0.05 | 0.05 | 0.05 | 0.05 | 0.05 | 0.05 | 0.05 | 0.05 | 0.05 |
| TOTAL | 100 | 100 | 100 | 100 | 100 | 100 | 100 | 100 | 100 | 100 | 100 |
| Effective Si %: resin + glass fiber phase | 0 | 0 | 0 | 2.0 | 3.0 | 3.0 | 3.0 | 4.5 | 4.5 | 6.0 | 6.0 |

Example 3

BPA Polycarbonate/Siloxane Polycarbonate Copolymer Blends with 25% S-Glass Fiber A third design of experiment analysis was performed to further evaluate the mechanical performance of polycarbonate blend compositions that comprise polyorganosiloxane/polycarbonate block copolymer, polycarbonate polymer and glass fiber. The target of this study was to design polycarbonate blend compositions using different polysiloxane/polycarbonate block copolymers in varying amounts while the amount of glass fiber, 25% and the type of glass fiber remained the same. The polyorganosiloxane/polycarbonate block copolymers used differed in the amount of siloxane in the copolymers and also in how they were made, i.e., batch versus tube and/or transparent versus opaque polymerization processes.

Three different polyorganosiloxane/polycarbonate block copolymers were used in this study: (1) Si/PC-P, an opaque block copolymer of bisphenol A polycarbonate and polydimethylsiloxane having 20% siloxane by weight produced by batch polymerization (used in Examples 1 and 2); (2) a transparent block copolymer of bisphenol A polycarbonate and polydimethylsiloxane (commercially available as LEXAN™EXL 1414T from SABIC Innovative Plastics); and (3) Si/PC-PT; a semi-transparent block copolymer of bisphenol A polycarbonate and polydimethylsiloxane having 20% siloxane by weight produced by tube polymerization.

All of the compositions included 25% by weight of 10 urn, 4.7 mm S-glass fiber (commercially available from Owens Corning Fiberglass). The polycarbonate polymer (PC-BPA) was a high flow grade derived from bisphenol A (commercially available as LEXAN™ML from SABIC Innovative Plastics). Other additives such as phosphite heat stabilizer Irgafos 168 commercially available from Ciba-Geigy) and lubricant Glycolube® P-ETS (commercially available from Lonza) were included in each formulation in equal amounts.

The results of the design of experiment are set forth in Table 3 below as formulations (1-7). The effective % siloxane for the overall composition and the resin phase were calculated for each formulation and are shown in Table 3. All quantities in Table 3 are expressed as weight percentages.

TABLE 3

| | | 1 | 2 | 3 | 4 | 5 | 6 | 7 |
|---|---|---|---|---|---|---|---|---|
| 1 | LEXAN ™ EXL 1414T | 67 | 33 | 0 | 0 | 0 | 0 | 0 |
| 2 | Si/PC—PT (pelletized) | 0 | 0 | 0 | 0 | 0 | 0 | 17 |

TABLE 3-continued

| | | 1 | 2 | 3 | 4 | 5 | 6 | 7 |
|---|---|---|---|---|---|---|---|---|
| 3 | Si/PC—PT (pelletized) | 0 | 0 | 17 | 8 | 0 | 0 | 0 |
| 4 | PC—BPA | 7.5 | 41.5 | 57.5 | 66.5 | 73 | 71 | 57.5 |
| | S-glass fiber | 25 | 25 | 25 | 25 | 25 | 25 | 25 |
| 5 | CIBA GEIGY IRGAFOS 168 | 0.1 | 0.1 | 0.1 | 0.1 | 0.1 | 0.1 | 0.1 |
| 6 | LONZA GLYCOLUBE PETS | 0.3 | 0.3 | 0.3 | 0.3 | 0.3 | 0.3 | 0.3 |
| | Si % overall | 3.35 | 1.65 | 3.4 | 1.6 | 0 | 0 | 3.4 |
| | Si % resin | 4.50 | 2.21 | 4.56 | 2.15 | 0 | 0 | 4.56 |

Example 4

Mechanical Performance of BPA Polycarbonate/20% Siloxane Polycarbonate Block Copolymer Blends with E-Glass Fiber The polycarbonate blends from Example 1 reinforced with E-glass according to the formulations in Table 1 were tested for various properties. These properties are set forth below in Table 4. NMR spectroscopy was used to determine the % siloxane in the overall composition as well as the % siloxane in the resin phase and the % BPA of the composition.

"Den" refers to density measured in accordance with standard ASTM D792. "TM" refers to tensile modulus measured in accordance with standard ASTM D638, 5 mm/min, "TS" refers to tensile strength measured in accordance with standard ASTM D638, 5 mm/min. "TE" refers to tensile elongation measured in accordance with standard ASTM D638, 5 mm/min. "FM" refers to flexural modulus measured in accordance with standard ASTM 790, 3.2 mm. "FS" refers to flexural strength measured in accordance with standard ASTM D790, 3.2 mm. "NII" refers to IZOD notched impact strength in accordance with standard ASTM D256, 23° C., 2.751 "UNII" refers to unnotched IZOD impact strength in accordance with standard ASTM D256, 23° C., 11 J. "MFR" refers to melt flow rate in accordance with standard ASTM D1238, 285 C, 5 k. Unless otherwise specified, quantities in Table 4 are expressed as weight percentages.

TABLE 4

|  | Units | 1 | 2 | 3 | 4 | 5 | 6 | 7 | 8 | 9 | 10 |
|---|---|---|---|---|---|---|---|---|---|---|---|
| % Si overall | % | 0 | 0 | 3.2 | 3.2 | 5.5 | 7.5 | 8.7 | 10.7 | 13.0 | 15.0 |
| % Si resin | % | 0 | 0 | 4.6 | 5.4 | 10.0 | 10.0 | 14.6 | 15.3 | 20.0 | 20.0 |
| BPA | % | 75 | 55 | 66.7 | 56.7 | 49.5 | 67.5 | 51.2 | 59.2 | 52.0 | 60.0 |
| Glass Fiber | % | 25 | 45 | 40 | 30 | 45 | 25 | 40 | 30 | 35 | 25 |
| DEN | Mpa | 1.4 | 1.6 | 1.4 | 1.5 | 1.5 | 1.3 | 1.5 | 1.4 | 1.4 | 1.4 |
| TM | Mpa | 7062 | 11960 | 10080 | 7878 | 10920 | 6736 | 9324 | 7360 | 7460 | 5690 |
| TS | Mpa | 113 | 140 | 126 | 114 | 124 | 99 | 97.2 | 87.9 | 54 | 48.9 |
| TE | % | 2.69 | 2.02 | 2.47 | 2.63 | 2.45 | 2.65 | 2.04 | 2.26 | 1.45 | 1.60 |
| FM | Mpa | 7210 | 12800 | 11000 | 8450 | 11800 | 6740 | 9800 | 7500 | 7350 | 5760 |
| FS | Mpa | 183 | 221 | 208 | 188 | 193 | 157 | 150 | 129 | 83.9 | 73.7 |
| NII | J/m | 120 | 143 | 193 | 193 | 201 | 206 | 175 | 162 | 94.6 | 93.5 |
| UNII | J/m | 879 | 803 | 797 | 795 | 751 | 706 | 583 | 524 | 250 | 296 |
| MFR | g/10 min | 28.4 | 33 | 16.3 | 25.5 | 9.2 | 11.2 | 4.92 | 4.77 | 2.67 | 2.33 |
| Viscosity | Pa · s | 210 | 226 | 238 | 206 | 231 | 201 | 187 | 177 | 147 | 144 |

Figure 2:
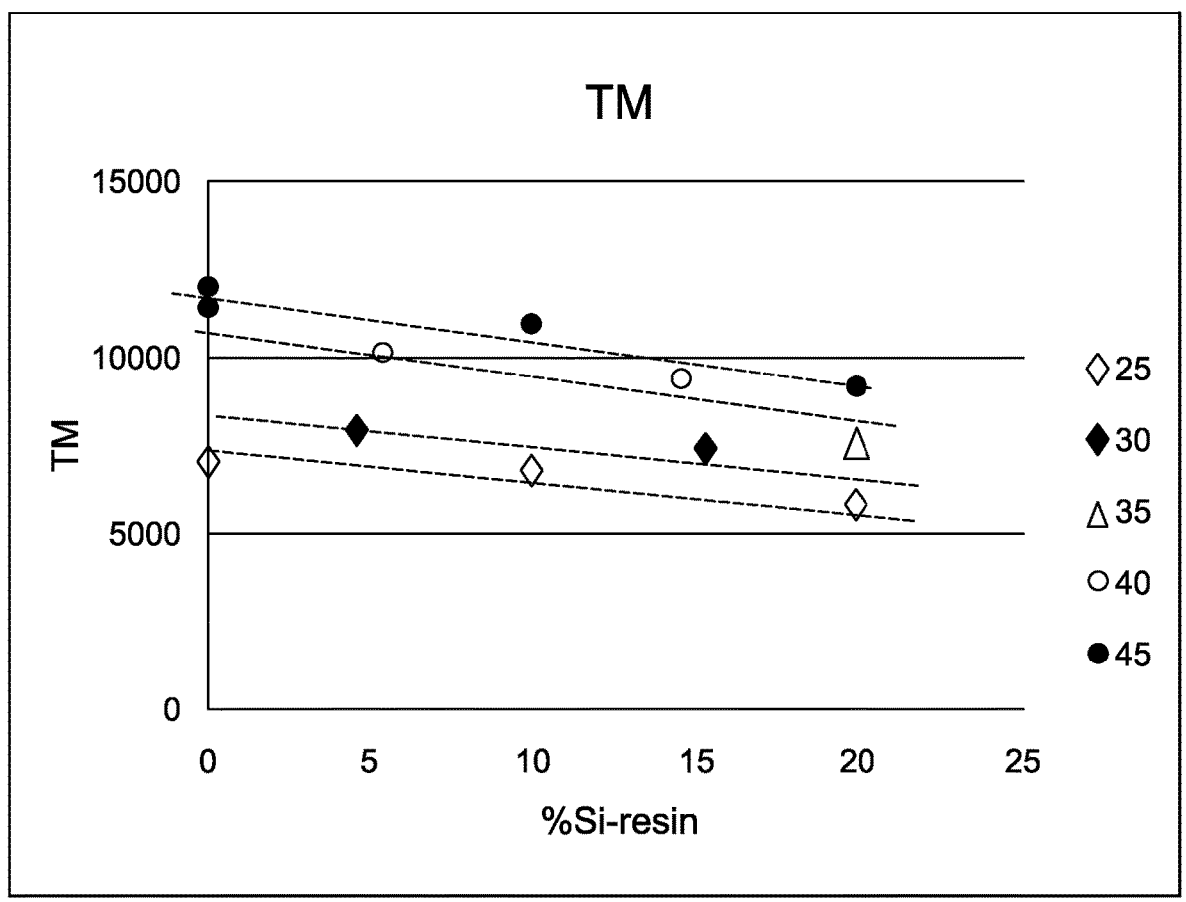
FIG. 2 is a graph showing the % Si-resin versus tensile modulus for the thermoplastic compositions in Example 4 having different E-glass loadings.
Figure 3:
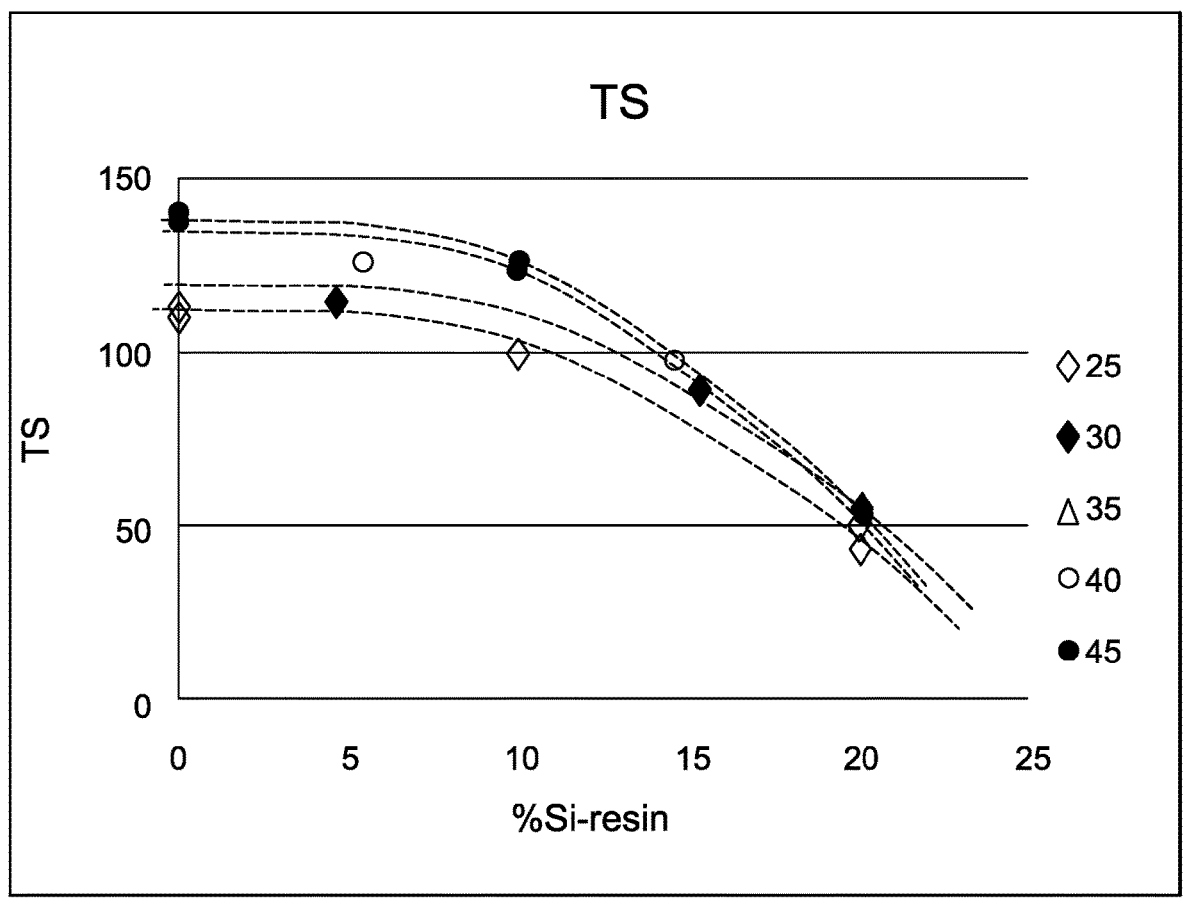
FIG. 3 is a graph showing the tensile strength as a function of % Si-resin for the thermoplastic compositions in Example 4 having different E-glass loadings.

The results in Table 4 demonstrate a clear trend of mechanical performance according to the % Si and % glass fiber. FIGS. 2 and 3 are graphs reflecting the tensile modulus and tensile strength, respectively, as a function of % Si in the resin phase for glass loadings between 25-45%, From FIG. 2, it can be seen that the tensile modulus decreased as % Si in the resin phase increased. The tensile modulus al so decreased as the glass loading decreased. For example, the highest tensile modulus values occurred at the lower % Si in the resin phase and the higher glass loadings. From FIG. 3, it can be seen that the tensile strength reached a maximum at 40 wt % glass fiber and then decreased only slightly as the % Si in the resin phases increased. The tensile strength, however, decreased dramatically when % Si exceeded 10% independent of glass loadings between 25-45 wt %.

Figure 4:
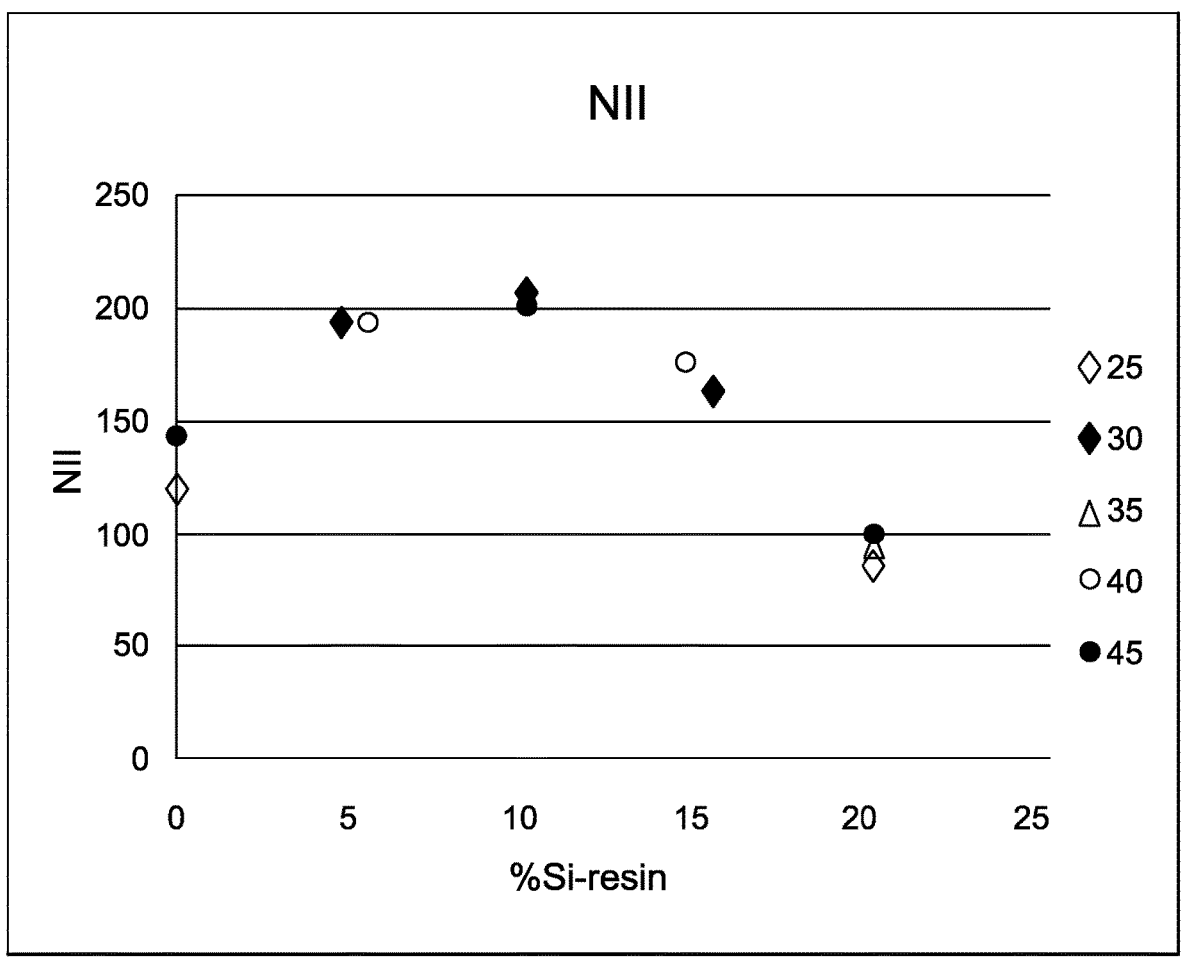
FIG. 4 is a graph showing the % Si-resin versus notched Izod impact strength for the thermoplastic compositions in Example 4 having different E-glass loadings.
Figure 5:
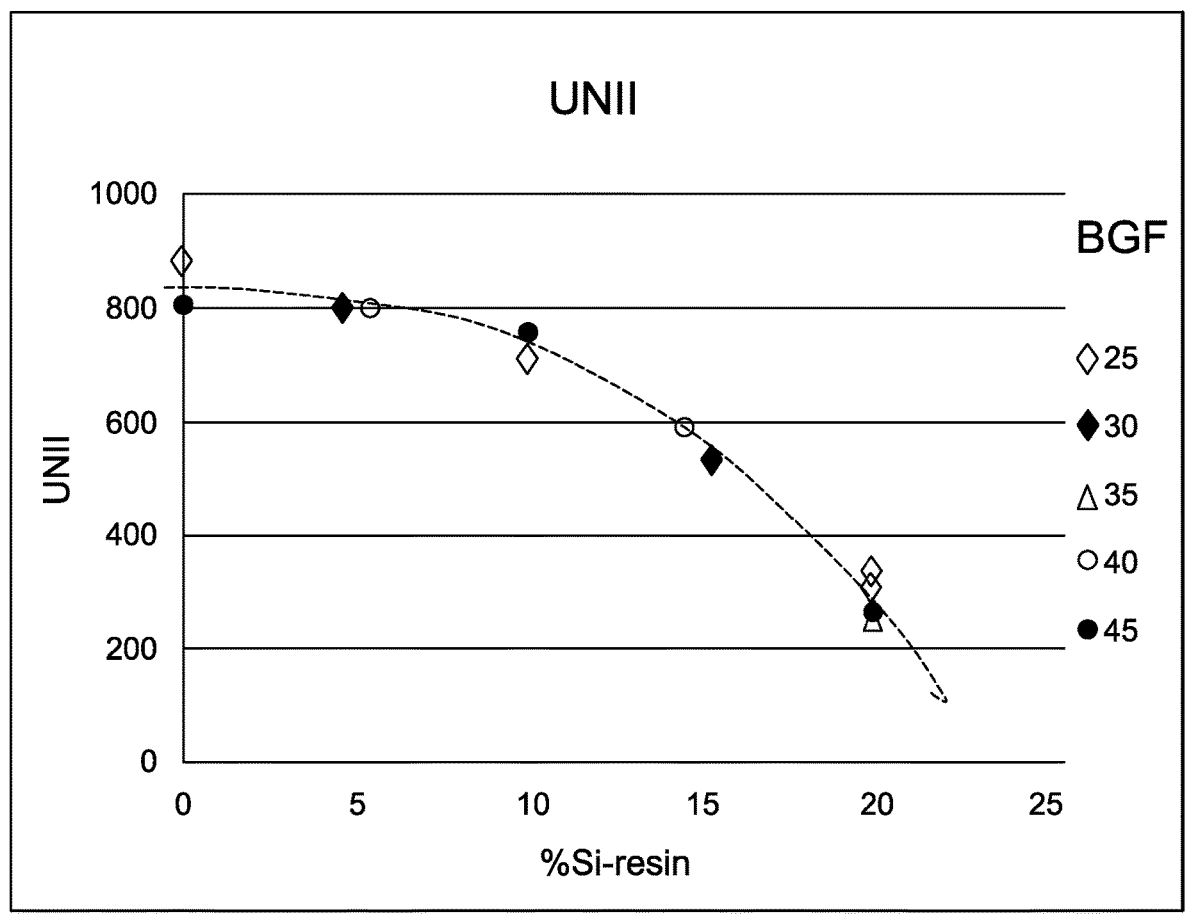
FIG. 5 is a graph showing the % Si-resin versus unnotched Izod impact strength for the thermoplastic compositions in Example 4 having different E-glass loadings.

FIGS. 4 and 5 are graphs reflecting the notched and unnotched IZOD impact values, respectively, as a function of the ° %) Si in the resin phase for glass loadings between 25-45%. From FIG. 4, it can be seen that the notched IZOD impact had an optimal range between 5-10% Si in the resin phase independent of glass loadings between 25-45%. FIG. 5 demonstrates that the trend for unnotched IZOD impact is similar to the trend for tensile strength and is independent of glass loading. The unnotched IZOD impact gradually decreased as the % Si in the resin phase increased and then started to decrease dramatically when % Si exceeded 10%.

Example 5

Mechanical Performance of BPA Polycarbonate/20% Siloxane Polycarbonate Block Copolymer Blends with S-Glass Fiber Loadings Another design of experiment analysis was performed to further evaluate the effect of glass loading on the mechanical performance of the polycarbonate blend compositions that comprise polyorganosiloxane/polycarbonate block copolymer and polycarbonate. This experiment designed compositions having between 3 to 7.5 wt % Si in the resin phase and 10 to 55 wt % glass loadings. The polyorganosiloxane/polycarbonate block copolymer used was Si/PC-P (the same as in Example 1), an opaque copolymer of bisphenol A and polydimethylsiloxane having 20% siloxane by weight. The glass fiber used was 10 µm, 4.7 mm S-glass fiber (commercially available from Owens Corning Fiberglass).

Figure 6:
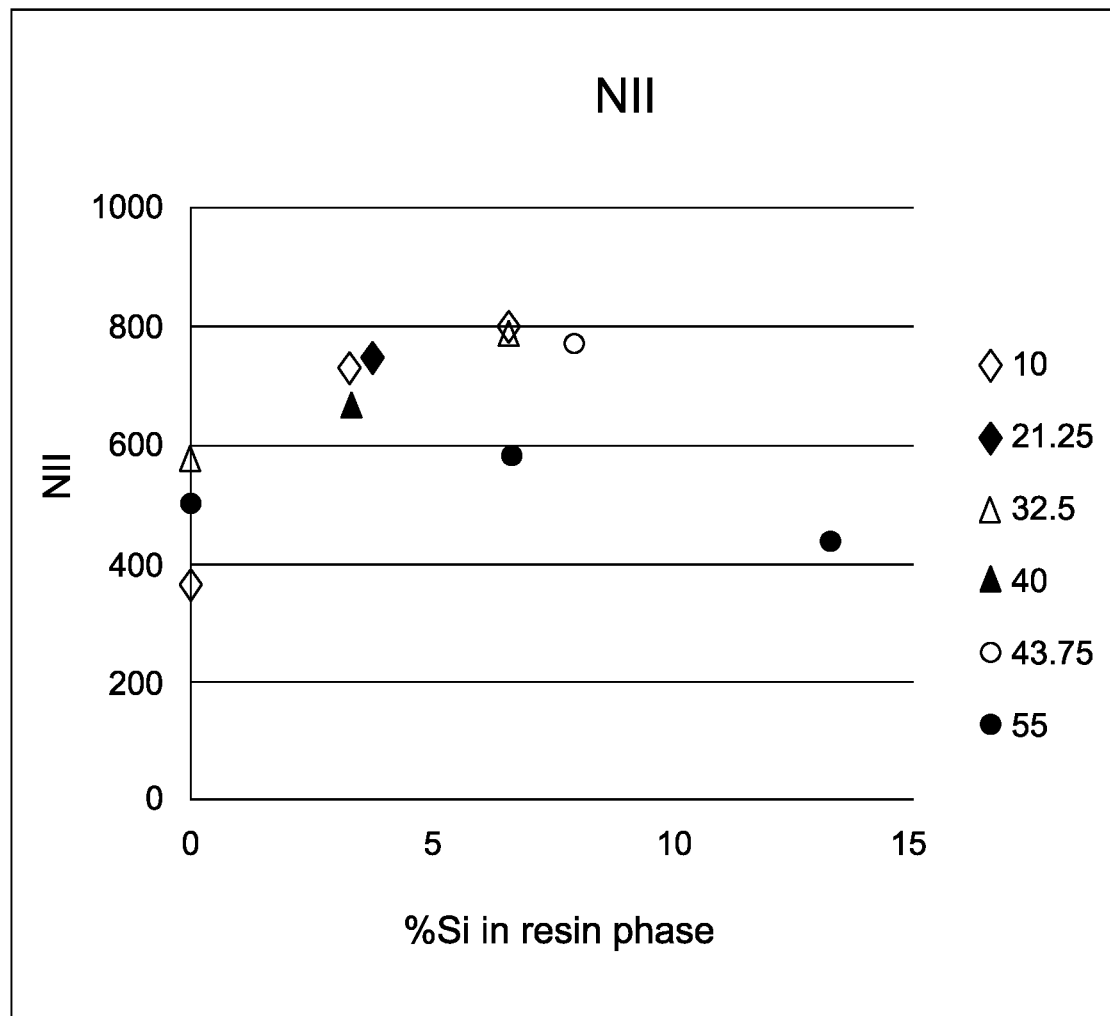
FIG. 6 is a graph showing % Si-resin versus flexural strength for the thermoplastic compositions in Example 5 having 25% glass loadings.
Figure 7:
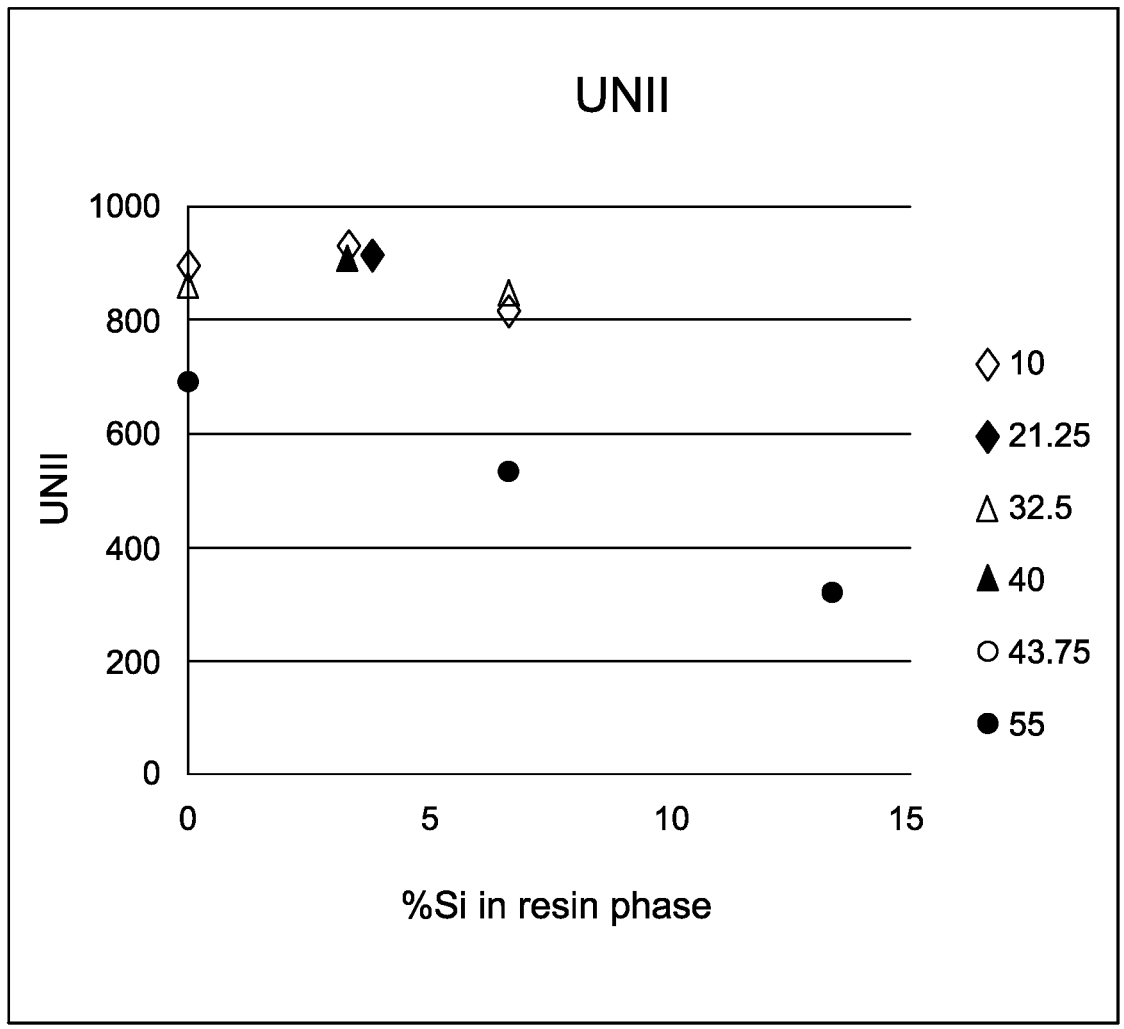
FIG. 7 is a graph showing % Si-resin versus viscosity for the thermoplastic compositions in Example 5 having 25% glass loading.

Notched IZOD impact, and unnotched IZOD impact were calculated and plotted against % Si in the resin phase for the different glass loadings. The results of the experiment are shown graphically in FIGS. 6 and 7 and generally follow the previous trends observed, At 55% glass loading, the glass phase became the dominant phase in the composition and determined the mechanical properties of the composition. As shown in FIGS. 6 and 7, the combined optimum performance of the mechanical properties was observed around 5 wt % Si in the resin phase.

Example 6

Mechanical Performance of BPA Polycarbonate/Siloxane Polycarbonate Copolymer Blends with 25% S-Glass Fiber Another design of experiment analysis was performed to further evaluate the effect of using different polysiloxane/polycarbonate block copolymers on the mechanical properties of polycarbonate blend compositions that included 25% S-glass loadings.

Three different polyorganosiloxane/polycarbonate block copolymers were used in this study: (1) Si/PC-P, an opaque block copolymer of bisphenol A polycarbonate and polydimethylsiloxane having 20% siloxane by weight produced by batch polymerization (used in Examples 1 and 2); (2) a transparent block copolymer of bisphenol A polycarbonate and polydimethylsiloxane (commercially available as LEXAN™EXL 1414T from SABIC Innovative Plastics); and (3) Si/PC-PT, a semi-transparent block copolymer of bisphenol A polycarbonate and polydimethylsiloxane having 20% siloxane by weight produced by tube polymerization. All of the compositions included 25% by weight of 10 µm, 4.7 mm S-glass fiber (commercially available from Owens Corning Fiberglass).

Figure 8:
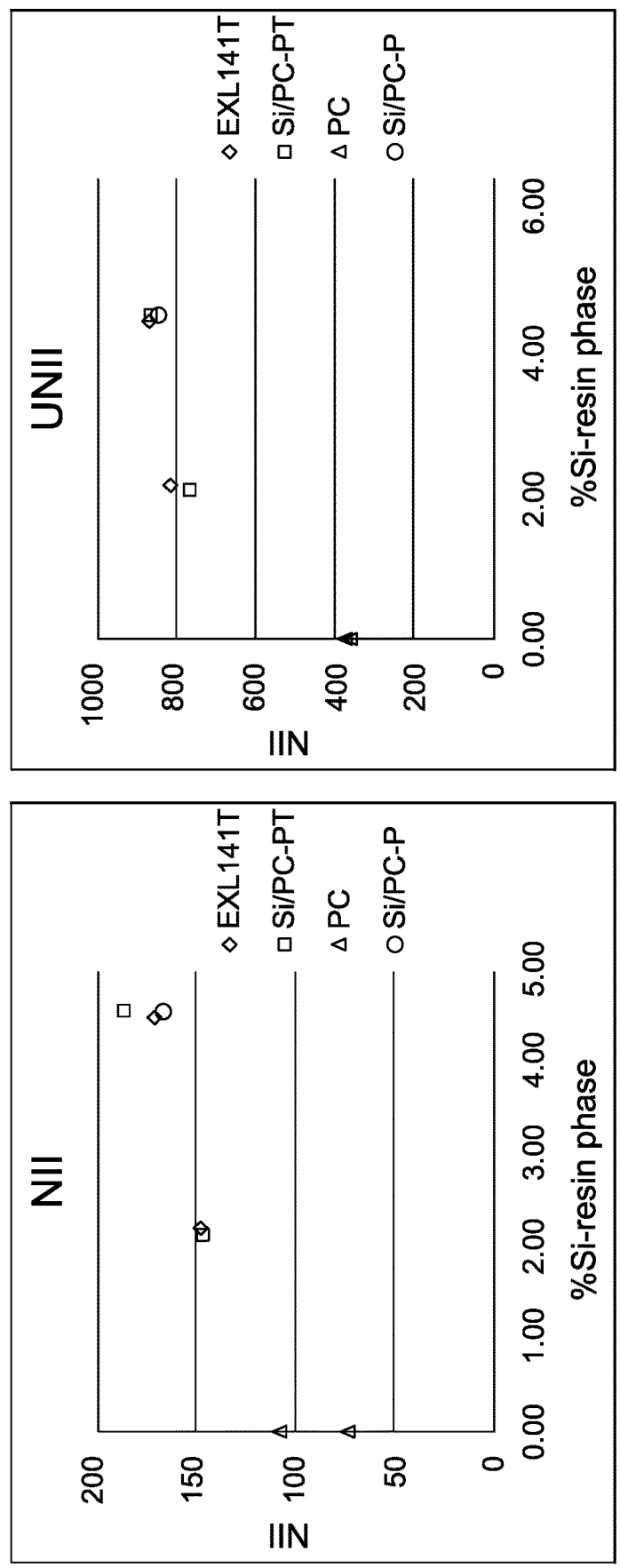
FIG. 8 has graphs showing % Si-resin versus notched and unnotched Izod impact values for the thermoplastic compositions in Example 6 having 25% glass loading.
Figure 9:
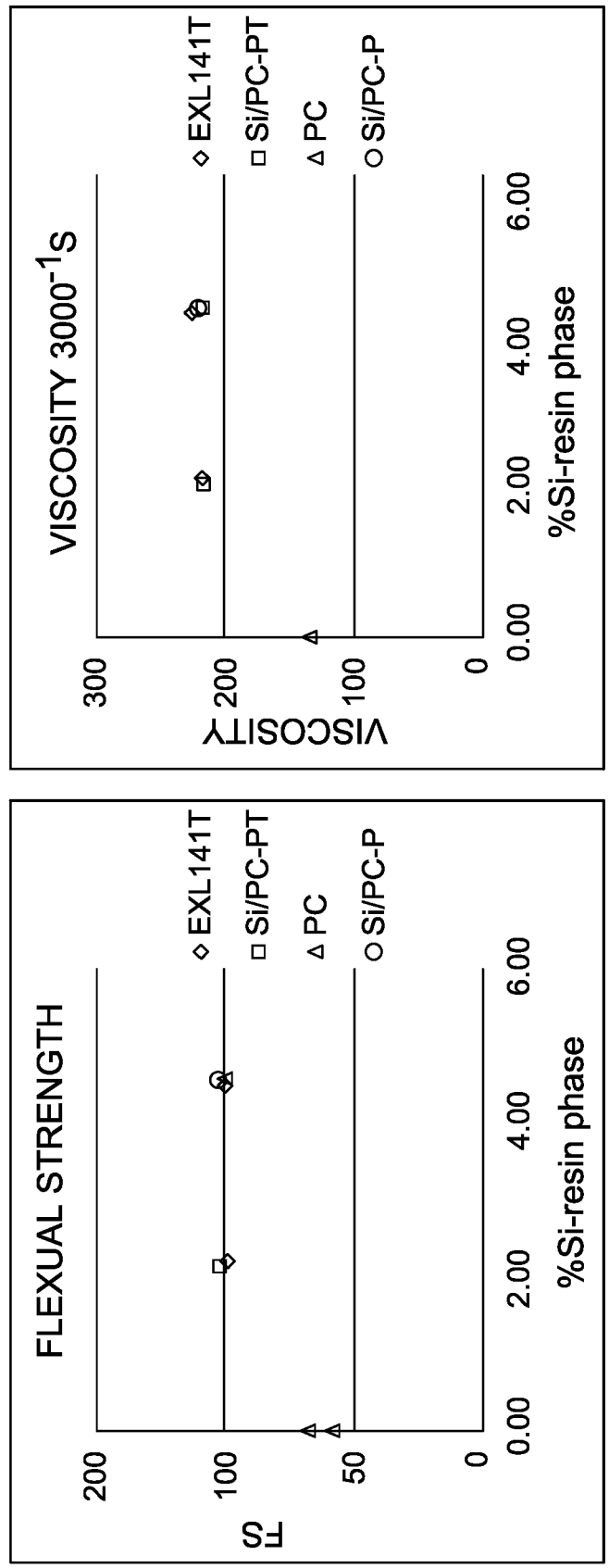
FIG. 9 has graphs showing % Si-resin versus flexural strength and viscosity for the thermoplastic compositions in Example 6 having 25% glass loading.
Figure 10:
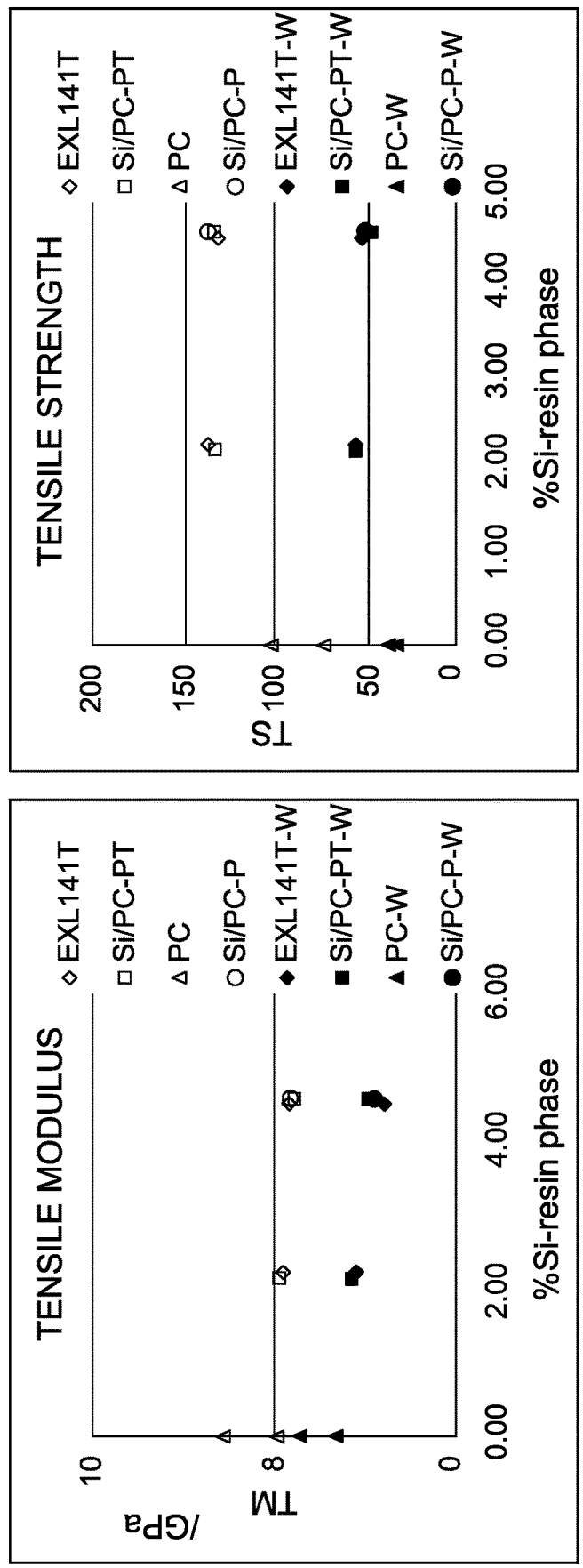
FIG. 10 has graphs showing tensile modulus and tensile strength versus % Si-resin including weld line performance for the thermoplastic compositions in Example 7.

The notched and unnotched IZOD impact for each composition was plotted as a function of % Si in the resin phase and is shown in FIGS. 8 and 9. The flexural strength and viscosity was also plotted as a function of % Si in the resin phase and is shown in FIGS. 10 and 11. From FIGS. 8-11, it can be seen that the results are generally the same for compositions having the same % Si in the resin phase. Therefore, mechanical performance was a function of the % Si in the resin and was independent of the polymerization process (batch or tube) used to form the block copolymer and the siloxane domain size. Furthermore, mechanical performance of the composition was not affected by whether the block copolymer used was in an opaque, semi-transparent or transparent form.

Example 7

Weldline Performance of BPA Polycarbonate/Siloxane Polycarbonate Copolymer Blends with 25% S-Glass Fiber Another design of experiment analysis was performed to evaluate the weldline strength of polycarbonate blend compositions using different polysiloxane block copolymers with 25% S-glass loadings. The polycarbonate blend compositions used in this design of experiment were the same as in Example 6, The weldline performance was tested in accordance with ASTM D638 using a tensile bar tool that is end-gated at both ends. The melt flow front meets at the neck of the tensile bar to form a weldline. Flow fronts, however, are commonly avoided in real tool designs. Therefore, actual weldline performance for these polycarbonate blend compositions may be even better.

FIG. 10 graphically presents the results for tensile modulus and tensile strength at the weldline. As shown in FIG. 10, the tensile strength at weldline is typically at 50 MPa for all of the glass fiber reinforced polycarbonate blend compositions. Again, the results for the compositions overlapped each other according to % Si in the resin phase regardless of the domain size of the siloxane polycarbonate block copolymer.

Example 8

Surface Aesthetics of Molded Articles

A visual comparison was made of injection molded 0.8 mm flame bars that were formed using three different polycarbonate blend compositions. The polycarbonate blend compositions included 25 wt % S-glass fiber and 4.5 wt % Si in the resin phase. The polycarbonate blend compositions varied by the polyorganosiloxane/polycarbonate block copolymer (Si/PC-P, Si/PC-PT, and Si/PC-T) used in the composition.

Visual comparison show that flame bars having the darkest color were formed using Si/PC-P, an opaque polyorganosiloxane polycarbonate block copolymer having 20 wt % siloxane. The flame bars having a median dark color were formed using Si/PC-PT, a semi-transparent polyorganosiloxane polycarbonate block copolymer having 20 wt % siloxane. The flame bars that were formed using polyorganosiloxane polycarbonate block copolymer having 6 wt % siloxane show the lightest color, the best surface gloss, and least defects due to the migration of the siloxane to the surface. The flame bars were center gated and the surface defects are the most pronounced at the two ends, while the center was the gate mark.

ASPECTS

In various aspects, the present disclosure pertains to and includes at least the following aspects: Aspect 1: A thermoplastic composition comprising: (a) a resin phase comprising a polysiloxane block copolymer and a polycarbonate, wherein the polysiloxane block copolymer comprises polyorganosiloxane blocks and polycarbonate blocks and the resin phase has between 2.0% and 10.0% by weight of siloxane; and (b) 10% to 55%, especially 25% to 45% of glass fibers by weight of the thermoplastic composition.

Aspect 2: The composition of aspect 1, wherein the resin phase has between 3.0 wt % and 7.5 wt % of siloxane.

Aspect 3: The composition of any of the preceding aspects, wherein the resin phase has 5 wt % of siloxane.

Aspect 4: The composition of any of the preceding aspects, wherein the glass phase comprises E-glass fibers, S-glass fibers or a combination thereof.

Aspect 5: The composition of any of the preceding aspects, wherein the polycarbonate is not the same as the polysiloxane block copolymer.

Aspect 6: The composition of any of the preceding aspects, wherein the polycarbonate is derived from bisphenol A.

Aspect 7: The composition of any of the preceding aspects, wherein the polysiloxane block copolymer comprises polydimethylsiloxane and bisphenol A.

Aspect 8: The composition of any of the preceding aspects, wherein the polyorganosiloxane blocks comprise polydimethylsiloxane and the polycarbonate blocks are derived from or comprise bisphenol A.

Aspect 9: The composition of any of the preceding aspects, wherein the polysiloxane block copolymer contains 6% to 20% by weight of siloxane.

Aspect 10: The composition of aspect 9, wherein the polysiloxane block copolymer is produced using a tube polymerization process.

Aspect 11: The composition of any of the preceding aspects, wherein the polysiloxane block copolymer contains 6% by weight of siloxane.

Aspect 12: The composition of aspect 11, wherein the polysiloxane block copolymer is produced using a tube polymerization process.

Aspect 13: The composition of any of the preceding aspects, wherein the polysiloxane block copolymer contains 20% by weight of siloxane.

Aspect 14: The composition of aspect 13, wherein the polysiloxane block copolymer is produced using a batch polymerization process.

Aspect 15: The composition of any of the preceding aspects, wherein the polysiloxane block copolymer is transparent.

Aspect 16: The composition of any of the preceding aspects, wherein the polysiloxane block copolymer is semi-transparent.

Aspect 17: The composition of any of the preceding aspects, wherein the polysiloxane block copolymer is opaque.

Aspect 18: An article comprising the thermoplastic composition of any of the preceding aspects.

Aspect 19: The composition of any of the preceding aspects, wherein the composition has a notched Izod impact strength ranging from 150 to 210 Joules per meter measured at 23° C. according to ASTM D256.

Aspect 20: The composition of any of the preceding aspects, wherein the composition has a notched Izod impact strength of at least 190 Joules per meter measured at 23° C. according to ASTM D256.

Aspect 21: The composition of any of the preceding aspects, wherein the composition has a notched Izod impact strength of at least 200 Joules per meter measured according to ASTM D256.

Aspect 22: The composition of any of the preceding aspects, wherein the composition has a tensile strength greater than 95 MPa as determined by ASTM D638.

Aspect 23: The composition of any of the preceding aspects, wherein the composition has a tensile strength greater than 100 MPa as determined by ASTM D638.

Aspect 24: The composition of any of the preceding aspects, wherein the composition has a tensile strength greater than 125 MPa as determined by ASTM D638.

Aspect 25: The composition of any of the preceding aspects, wherein the composition has a tensile modulus greater than 6700 MPa as determined by ASTM D638.

Aspect 26: The composition of any of the preceding aspects, wherein the composition has a tensile modulus greater than 7800 MPa as determined by ASTM D638.

Aspect 27: The composition of any of the preceding aspects, wherein the composition has a tensile modulus greater than 10,000 MPa as determined by ASTM D638.

Aspect 28: The composition of any of the preceding aspects, wherein the composition has a tensile modulus greater than 10,900 MPa as determined by ASTM D638.

Aspect 29: The composition of any of the preceding aspects, wherein the composition has an unnotched Izod impact strength ranging from 700 to 800 Joules per meter measured at 23° C. according to ASTM D256.

Aspect 30: The composition of any of the preceding aspects, wherein the composition has an unnotched Izod impact strength greater than 700 Joules per meter measured at 23° C. according to ASTM D256.

Aspect 31: The composition of any of the preceding aspects, wherein the composition has an unnotched Izod impact strength greater than 750 Joules per meter measured at 23° C. according to ASTM D256.

Aspect 32: The composition of any of the preceding aspects, wherein the composition has an unnotched Izod impact strength greater than 775 Joules per meter measured at 23° C. according to ASTM D256.

Aspect 33: The composition of any of the preceding aspects, wherein the composition has an unnotched Izod impact strength greater than 790 Joules per meter measured at 23° C. according to ASTM D256.

Aspect 34: The composition of any of the preceding aspects, wherein the elongation at break of the composition is equal to or greater than 2.45% as determined by ASTM D256.

Aspect 35: The composition of any of the preceding aspects, wherein the viscosity of the composition ranges from 200 to 240 Pa·s.

Aspect 36: The composition of any of the preceding aspects, wherein the viscosity of the composition is greater than 225 Pa·s.

Aspect 37: The composition of any of the preceding aspects, wherein the melt flow rate of the composition ranges from 9 to 25 g/10 min and the density of the composition is equal to or greater than 1.3 g/cm³.

Aspect 38: The composition of any of the preceding aspects, wherein the polysiloxane block copolymer comprises polydimethylsiloxane and bisphenol A; the polycarbonate homopolymer is derived from bisphenol A, and the composition has (i) a notched Izod impact strength of at least 150 Joules per meter measured at 23° C. according to ASTM D256; and (ii) a tensile strength greater than 95 MPa as determined by ASTM D638.

Aspect 39: A thermoplastic composition comprising: (a) a resin phase comprising a polysiloxane block copolymer including polydimethylsiloxane blocks and polycarbonate blocks derived from bisphenol A, and (2) a bisphenol A homopolycarbonate, wherein the resin phase has between 2.0 wt % and 10 wt % of siloxane, and (b) 10% to 55%, especially 25% to 45% glass fibers by weight of the thermoplastic composition, wherein the composition has (i) a notched Izod impact strength of at least 150 Joules per meter measured at 23° C. according to ASTM D256; (ii) a tensile strength greater than 95 MPa as determined by ASTM D638; (iii) a tensile modulus greater than 10,900 MPa as determined by ASTM D638 and (iv) an unnotched Izod impact strength greater than 775 Joules per meter measured at 23° C. according to ASTM D256.

Aspect 40: The composition of the preceding aspects, wherein the polysiloxane copolymer has a weight average molecular weight from about 20,000 to about 80,000.

Aspect 41: The composition of the preceding aspects, wherein the polysiloxane copolymer has a weight average molecular weight from about 30,000 to about 60,000.

Aspect 42: The composition of the preceding aspects, wherein the polycarbonate has a weight average molecular weight from about 3,000 to about 30,000.

Aspect 43: The composition of any of the preceding aspects, wherein the polysiloxane block copolymer comprises repeating structural units of formula (I)

wherein at least 60 percent of the total number of $R^1$ groups are aromatic organic radicals and the balance thereof are aliphatic, alicyclic, or aromatic radicals, and repeating structural units of formula (IV)

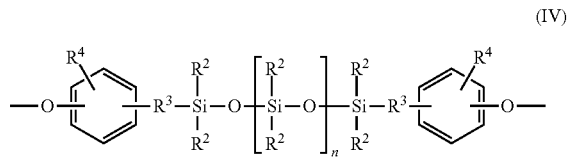

wherein $R^2$ is independently at each occurrence an aryl or aralkyl radical having 1 to 25 carbon atoms, $R^3$ is an aromatic radical having 6 to 8 carbon atoms, $R^4$ is independently at each occurrence a hydrogen, halogen, alkoxy having 1 to 8 carbon atoms, alkyl having 1 to 8 carbon atoms, or aryl having 6 to 13 carbon atoms; and wherein n is an integer that is less than or equal to 1,000; and wherein the polycarbonate polymer is different than the polysiloxane block copolymer and comprises repeating structural units of formula (XVIII)

wherein at least 60 percent of the total number of $R^9$ groups are aromatic organic radicals and the balance thereof are aliphatic, alicyclic, or aromatic radicals.

Aspect 44: The composition of the preceding aspects, wherein the composition has from 25% to 45% of glass fibers by weight, a notched Izod impact strength between 150 and 205 Joules per meter measured at 23° C. according to ASTM D256, a tensile strength between 95 and 125 MPa as determined by ASTM D638, and the resin phase of the composition has between 4% and 10% by weight of siloxane.

Aspect 45: The composition of the preceding aspects, wherein the composition has from 25% to 45% of glass fibers by weight, a notched Izod impact strength of at least 200 Joules per meter measured at 23° C. according to ASTM D256, a tensile strength greater than 110 MPa as determined by ASTM D638, and the resin phase of the composition has between 4% and 10% by weight of siloxane.

DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a nanocomposite" includes mixtures of two or more nanocomposites, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The term "molded article" as used herein refers to an article formed by any type of molding process or combination of molding processes known in the art. These molding processes include, but are not limited to, various melt forming process, injection molding, blow molding (stretch, extrusion or injection), sheet and film extrusion, profile extrusion, thermoforming, additive manufacturing, compression molding, fiber extrusion, powder sintering, transfer molding, reaction injection (RIM) molding, vacuum forming, cold casting, dip molding, slush molding and press molding.

As used herein, the terms "optional" or "optionally" means that the subsequently described event or circumstance can or cannot occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-F would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive such as methyl, ethyl, propyl, butyl, pentyl, hexyl, heptyl, octyl, nonyl, undecyl, decyl, dodecyl, octadecyl, nonadecyl eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like.

The term "alkylene" means the divalent moiety obtained on removal of two hydrogen atoms, each from a non-adjacent carbon atom of a parent hydrocarbon and includes alkylene of 3 to 15 carbon atoms, inclusive, such as 1,3-propylene, 1,4-butylene, 1,5-pentylene, 1,8-octylene, 1,10-decylene and the like.

Throughout the disclosure, the term "° C.," indicates degrees Celsius.

The term "alkyl" as used in the various embodiments of the present disclosure is intended to designate straight chain alkyls, branched alkyls, aralkyls, cycloalkyls, and bicycloalkyl radicals. The straight chain and branched alkyl radicals, unless otherwise specified, are those containing about 1 to about 40 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments, cycloalkyl radicals represented are those containing about 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments, aralkyl radicals are those containing about 7 to 14 carbon atoms; these include, but are not limited to, benzyl, phenylbutyl; phenylpropyl, and phenylethyl. In various other embodiments, aromatic radicals used in the present disclosure are intended to designate monocyclic or polycyclic moieties containing about 6 to about 12 ring carbon atoms. These aryl groups may also contain one or more halogen atoms or alkyl groups substituted on the ring carbons. In most embodiments, any substituent present is not in a ring position that would prevent an appropriate aromatic radical, such as in a phenolic aromatic radical, from reacting with an appropriate olefinic group, such as in a monoterpene. Some illustrative non-limiting examples of these aromatic radicals include phenyl, halophenyl, biphenyl, and naphthyl. In another embodiment, aromatic radicals used in the present disclosure are intended to designate aralkyl radicals containing about 7 to 14 carbon atoms.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

We claim:

1. A thermoplastic composition comprising:
    (a) a resin phase comprising a polysiloxane block copolymer including (1) polydimethylsiloxane blocks and bisphenol A polycarbonate blocks, and (2) a bisphenol A homopolycarbonate, wherein the resin phase has between 2.0 wt % and 10 wt % of siloxane; and
    (b) 10% to 55% glass fibers by weight of the thermoplastic composition,
    wherein the thermoplastic composition comprises from 49.5% to 67.5% of the bisphenol A homopolycarbonate by weight of the thermoplastic composition, and
    wherein the composition has
        (i) a notched Izod impact strength of from 193 to 206 J/m measured at 23° C. according to ASTM D256,
        (ii) a tensile strength between 99 and 126 MPa as determined by ASTM D638,
        (iii) a tensile modulus of from 6736 MPa to 10920 MPa as determined by ASTM D638, and
        (iv) an unnotched Izod impact strength of from 706 to 797 J/m measured at 23° C. according to ASTM D256.

2. The thermoplastic composition of claim 1, wherein the resin phase has between 3.0 wt % and 7.5 wt % by weight of siloxane.

3. The thermoplastic composition of claim 1, wherein the bonding glass fibers comprises S-glass fibers, E-glass fibers or a combination thereof.

4. The thermoplastic composition of claim 1, wherein the polysiloxane block copolymer contains 6% to 20% by weight of siloxane.

5. The thermoplastic composition of claim 1, wherein the composition has from 25% to 45% glass fibers by weight, and the resin phase of the composition has between 4% and 10% by weight of siloxane.

6. The thermoplastic composition of claim 1, wherein the elongation at break of the composition is from 2.45% to 2.65% as determined by ASTM D256.

7. The thermoplastic composition of claim 1, wherein the melt flow rate of the composition ranges from 9.2 to 25.5 g/10 min and the density of the composition is from 1.3 to 1.5 g/cm$^3$.

8. An article comprising the thermoplastic composition of claim 1.

* * * * *